Figure 1:
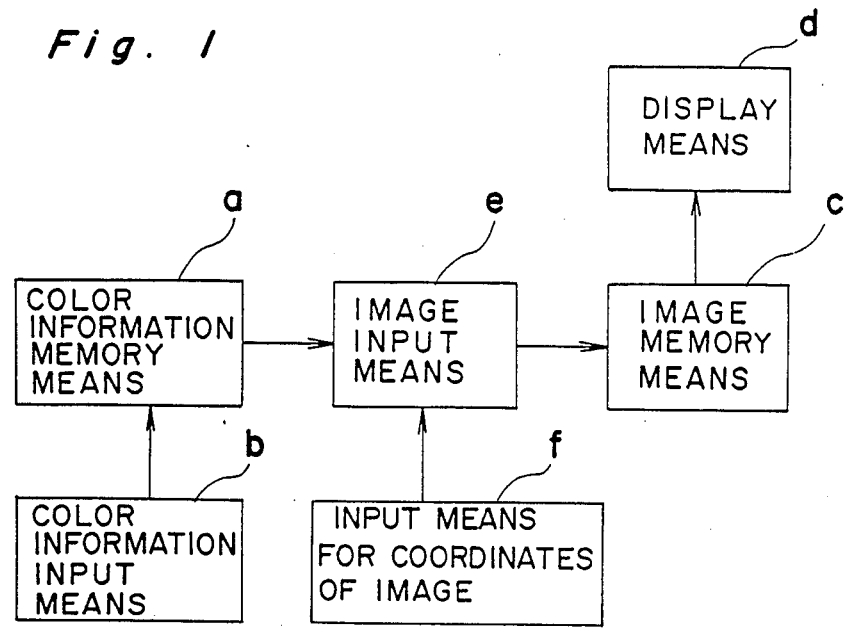

United States Patent [19]
Takakura et al.

[11] Patent Number: 4,695,966
[45] Date of Patent: Sep. 22, 1987

[54] IMAGE PROCESSING DEVICE

[75] Inventors: Masaki Takakura, Tenri; Yoji Noguchi, Ikoma; Yasukuni Yamane; Noritoshi Kako, both of Nara, all of Japan

[73] Assignee: Sharp Kabushiki Kaisha, Osaka, Japan

[21] Appl. No.: 714,757

[22] Filed: Mar. 22, 1985

[30] Foreign Application Priority Data

Mar. 22, 1984 [JP] Japan .................................. 59-55665
Mar. 22, 1984 [JP] Japan .................................. 59-55666
Mar. 22, 1984 [JP] Japan .................................. 59-55668
Apr. 18, 1984 [JP] Japan .................................. 59-78910
Jun. 4, 1984 [JP] Japan .................................. 59-116308
Dec. 24, 1984 [JP] Japan .................................. 59-280825
Mar. 18, 1985 [JP] Japan .................................. 60-55477

[51] Int. Cl.4 ...................... G06F 15/626; G09G 1/28
[52] U.S. Cl. .................................... 364/521; 340/717; 340/720
[58] Field of Search ............... 364/146, 188, 190, 521, 364/526; 340/709, 710, 716, 717, 720, 701, 703; 358/903

[56] References Cited

U.S. PATENT DOCUMENTS 3,405,457 10/1968 Bitzer .................................. 340/717
3,453,384 7/1969 Donner et al. ................. 340/717 X
3,906,197 9/1975 Grover .................................. 364/521
4,091,374 5/1978 Muller et al. ................... 340/717 X
4,539,585 9/1985 Spackova et al. ................... 358/903

FOREIGN PATENT DOCUMENTS 231643 12/1984 Japan .................................. 340/717
2056228A 3/1981 United Kingdom ................ 340/716

Primary Examiner—W. B. Perkey
Attorney, Agent, or Firm—Wegner & Bretschneider

[57] ABSTRACT

An image processing device is provided with a first memory and a second memory for storing color light and shade information of at least two portions of a picture, a coordinate inputting device, and a device for transferring and processing between the first memory and the second memory of the image information specified by the coordinate inputting device. Additionally, the image processing device has at least two display units and devices for simultaneously performing cursor-displays in the different image portions of the picture in accordance to the information from the coordinate inputting device. Each of the devices for performing cursor-displays provides images different in shape from each other.

1 Claim, 80 Drawing Figures

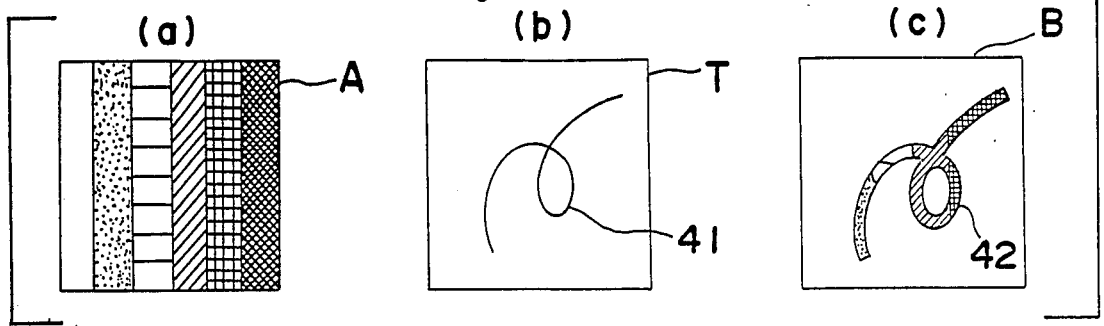
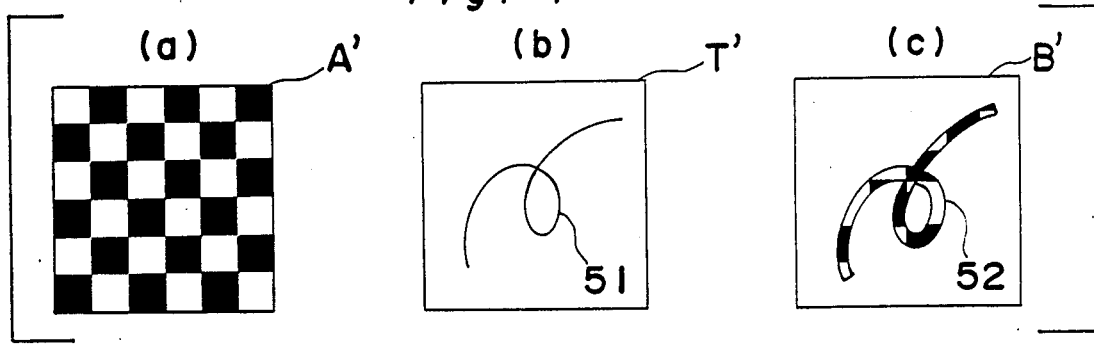
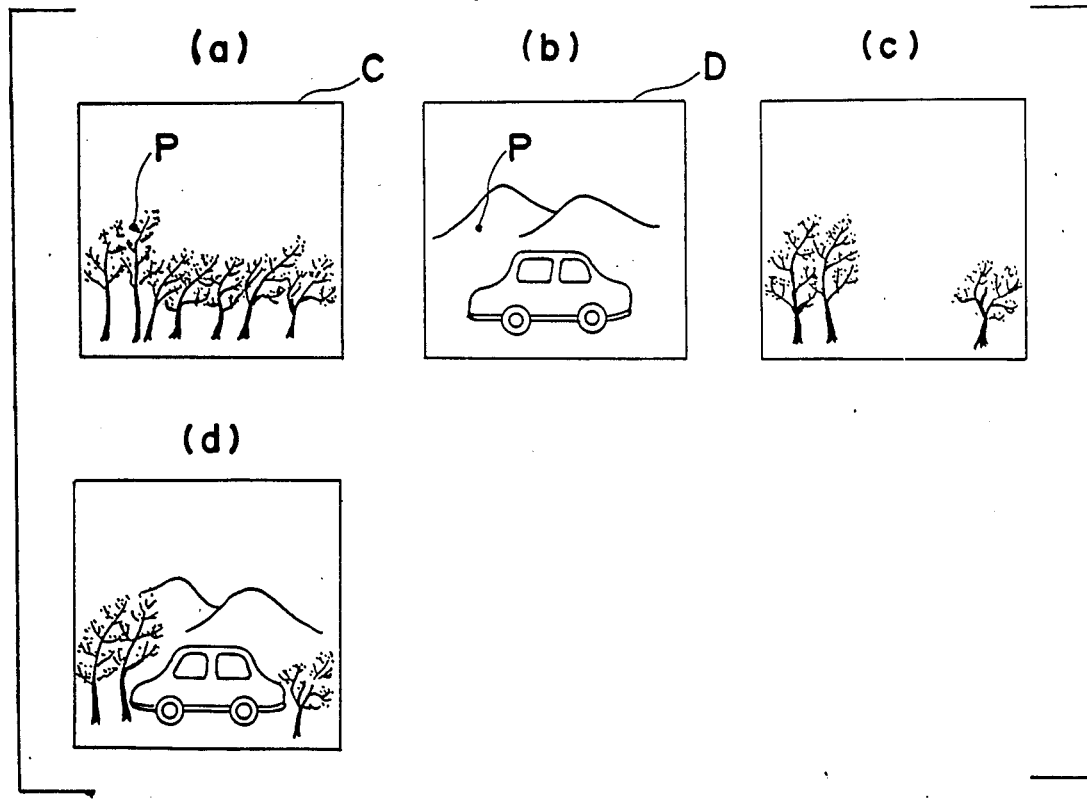

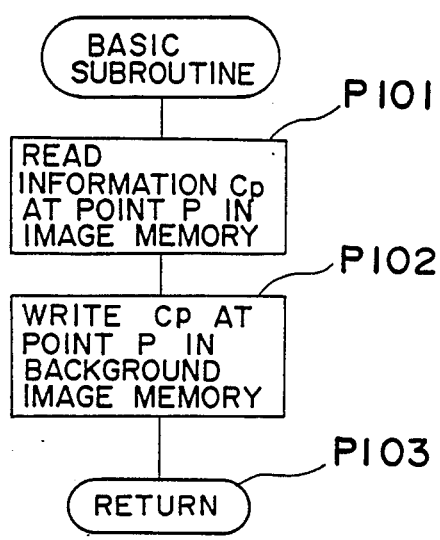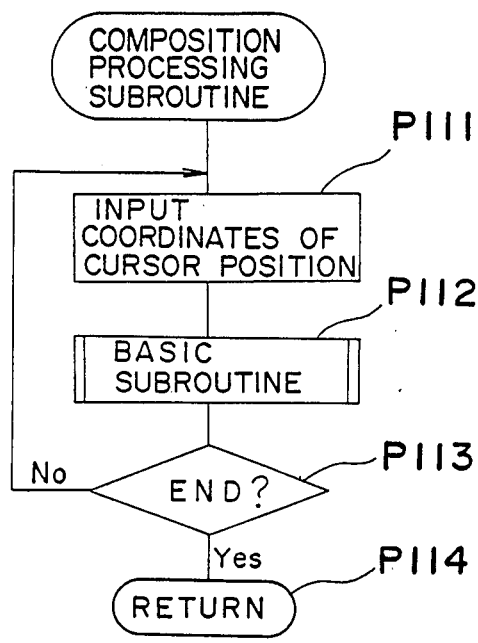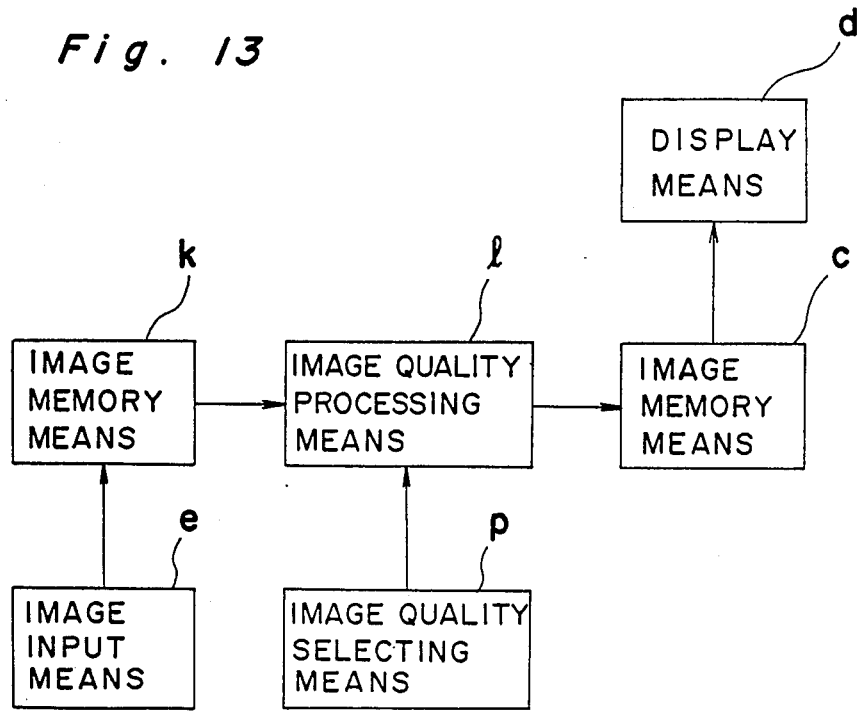

Fig. 14
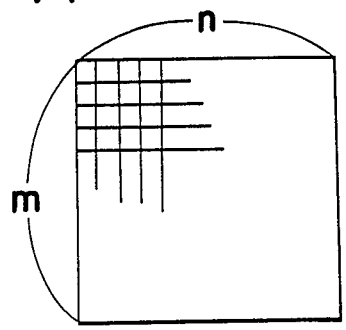
Fig. 16
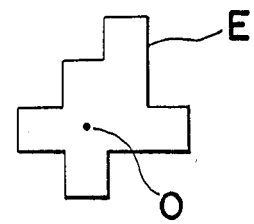
Fig. 15
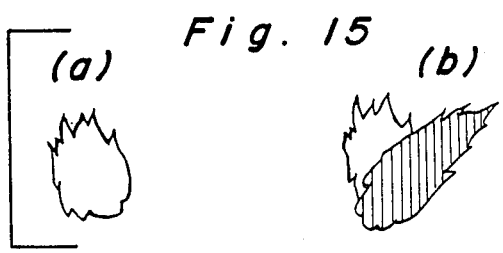
Fig. 17
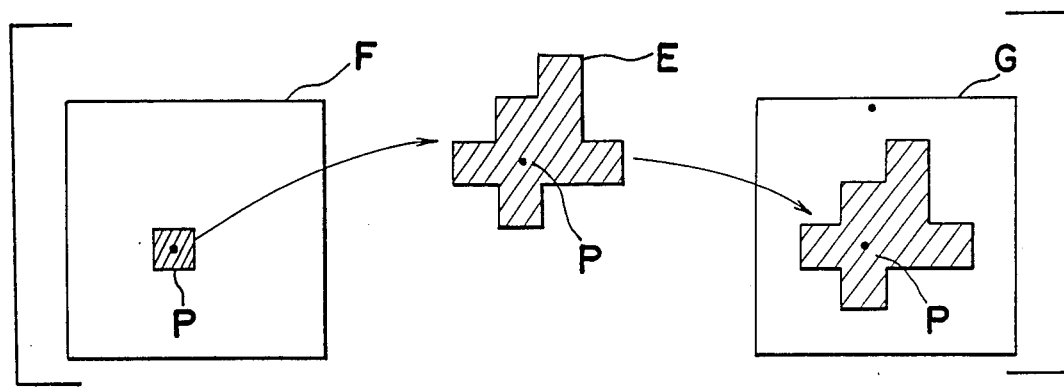
Fig. 18
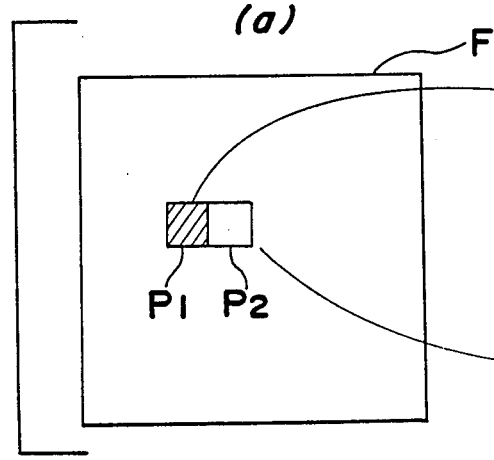
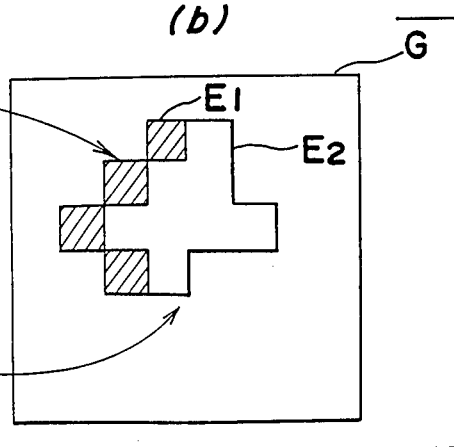

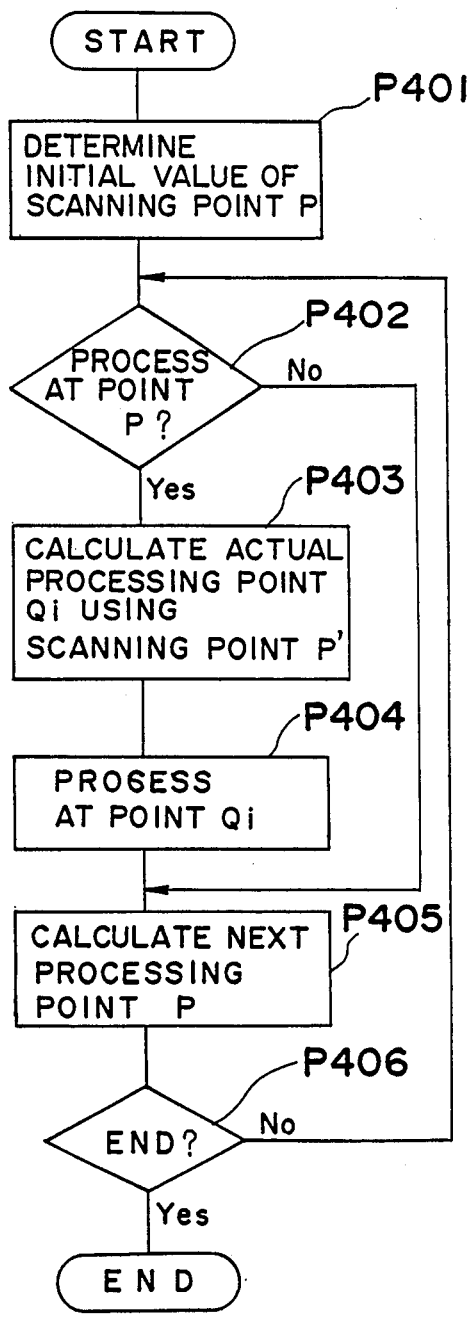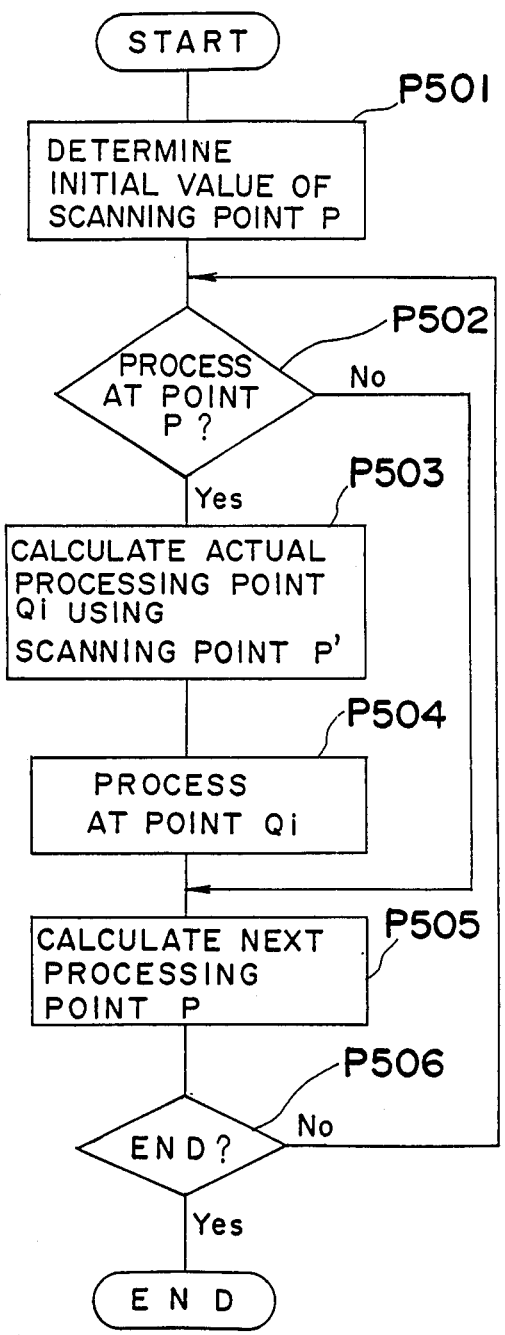

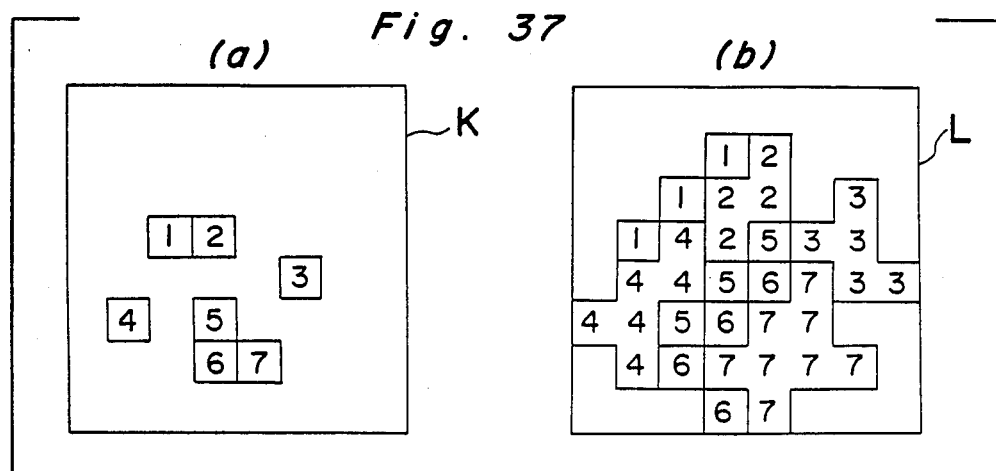
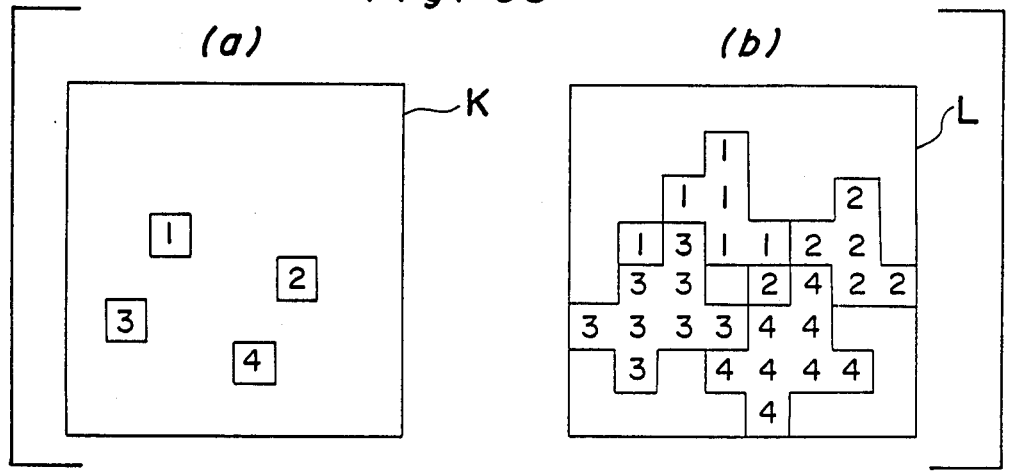
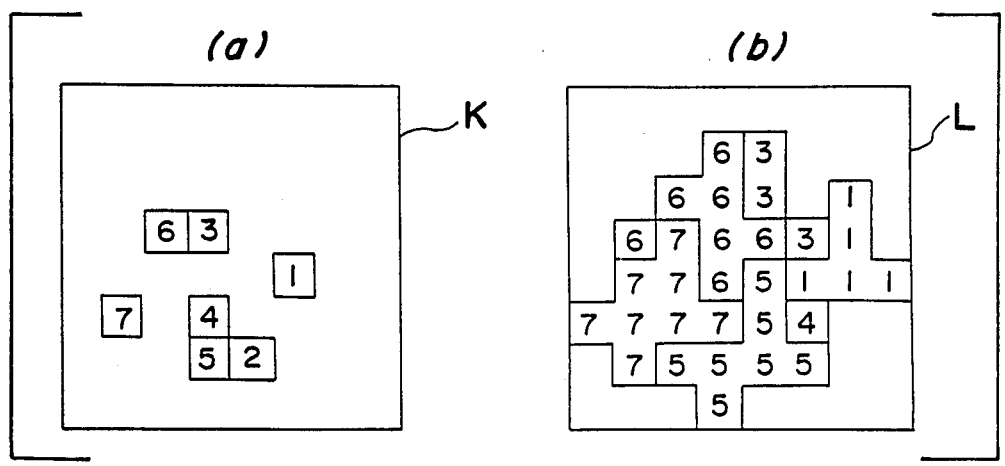

Fig. 44

(a)

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 128 | 0←X | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

(b)

Fig. 45

(a)

| $Q_{21}$ | $Q_{22}$ | $Q_{23}$ | $Q_{24}$ | $Q_{25}$ |
|---|---|---|---|---|
| $Q_{16}$ | $Q_{17}$ | $Q_{18}$ | $Q_{19}$ | $Q_{20}$ |
| $Q_{11}$ | $Q_{12}$ | $Q_{13}$ | $Q_{14}$ | $Q_{15}$ |
| $Q_6$ | $Q_7$ | $Q_8$ | $Q_9$ | $Q_{10}$ |
| $Q_1$ | $Q_2$ | $Q_3$ | $Q_4$ | $Q_5$ |

(b)

| 0 | 0 | 0 | 0 | 0 | 0 | 0 |
|---|---|---|---|---|---|---|
| 0 | 0 | 0 | 4 | 3 | 1.5 | 0 |
| 0 | 0 | 0 | 16 | 8 | 3 | 0 |
| 0 | 0 | 0 | 64 | 16 | 4 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

Fig. 46

(a)

| $Q_1$ | $Q_2$ | $Q_3$ | $Q_4$ | $Q_5$ |
|---|---|---|---|---|
| $Q_6$ | $Q_7$ | $Q_8$ | $Q_9$ | $Q_{10}$ |
| $Q_{11}$ | $Q_{12}$ | $Q_{13}$ | $Q_{14}$ | $Q_{15}$ |
| $Q_{16}$ | $Q_{17}$ | $Q_{18}$ | $Q_{19}$ | $Q_{20}$ |
| $Q_{21}$ | $Q_{22}$ | $Q_{23}$ | $Q_{24}$ | $Q_{25}$ |

(b)

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 64 | 16 | 4 | 0 |
| 0 | 0 | 0 | 16 | 8 | 3 | 0 |
| 0 | 0 | 0 | 4 | 3 | 1.5 | 0 |
| 0 | 0 | 0 | 0 | 0 | 0 | 0 |

IMAGE PROCESSING DEVICE

SUMMARY OF THE INVENTION

The characteristic of an image producing device in accordance with the present invention is to provide two types of image memories, i.e., a color information storage memory for storing in advance color information corresponding to each picture element on the picture face and an image storing memory for storing the images. In the painting of the images on the picture face, the color information corresponding to each coordinate of the images is to read the color information of address corresponding to the coordinate in the memory for storing the color information, to transfer it to a given shape of portion on the image memory so as to store it. Accordingly, it becomes possible to produce color changing images even if the color information is not inputted each time the coordinate of the image are inputted.

UTILIZATION FIELD IN INDUSTRY

The present invention relates to an image processing device for producing images by an electronic processing operation, and more particularly to an image producing device for producing, correcting the images on display such as CRT or the like by the use of coordinate inputting means such as light pen, digitizer, joy stick or the like.

CONVENTIONAL ART

Recently there is manufactured an electronic image processing device which are adapted to input images from a television camera, a video camera or the like, to add lines to the images, to compose the other images, to change the color. It is considered that this type of device will be spread in future into not only design field, art field, hobby field or the like from the characteristics that pigments, etc. are not necessary to produce images, also it is extremely easy to preserve, partially correct or reproduce the images.

However, the conventional image producing device used chiefly hand-writing inputs. Thus, as an image producing system, a system was common of selecting a color at first, specifying a size of a pen, drafting a line with the use of light pen, digitizer or the like on the display picture face. Also, some pens may not only change their sizes, but also draft air-brush-shaped touch lines, may produce oil-painting-brush-shaped touches, or some devices are announced which are capable of producing on the display the images like the oil painting. However, it takes a lot of time to produce the images with hand-writing as described hereinabove. In particular, when color shade images are produced, the inputting operation is very difficult to effect because of complicated color data. Also, some picture talents are required and it is difficult for the general persons to produce artistic pictures.

By the way, the images may be inputted by the analog digital conversion of video signals from a television camera, a video tape recorder or the like. This image inputting system requires about 1/30 seconds in time to input one sheet of images, so that images may be inputted at a very high speed as compared with the hand-writing operation.

Accordingly, one attractive image producing system comprises of inputting the images painted in picture from the television camera or the like, applying an processing operation upon them by an image microprocessor to convert them into oil-painting-shaped images. According to this system, it is expected that the oil-painting-shaped images may be produced extremely fast and without the picture talents. However, conventionally processings of changing the color, reducing resolution with respect to the images inputted from the video signals were performed, but a process of changing the image quality into the oil painting as described hereinabove was difficult to perform.

OBJECT OF THE INVENTION

An object of the present invention is to provide a device which is adapted to change the image quality with simple processings.

An object of the present invention is to provide an image composing system which is capable of composing complicated and fine images by simple operations.

An object of the present invention is to provide an image composing device which is capable of painting color-changing lines by simple operations.

An object of the present invention is to provide an image processing device, which uses two units of displays, normally displays the image contents of both memories respectively, simultaneously displays different shapes of cursors on each picture face, and is further superior in operationality.

An object of the present invention is to provide an image processing device that systematically combines various image processings, which conventionally existed independently as a process of a single function, to perform flexible compound processings and is superior in operationality.

An object of the present invention is to provide an image processing device, which is extremely useful in producing artistic images like the oil paintings from images like the real things such as photographs.

An object of the present invention is to provide an image processing device, which adds various degrees of different shading off to, for example, original pictures or performs directional shading off thereby producing the artistic images like india-ink paintings.

CONSTRUCTION OF THE INVENTION

The characteristic of an image producing device in accordance with the present invention is to provide two types of image memories, i.e., a color information storage memory for storing in advance color information corresponding to each picture element on the picture face and an image storing memory for storing the images. In the painting of the images on the picture face, the color information corresponding to each coordinate of the images is to read the color information of address corresponding to the coordinate in the memory for storing the color information, to transfer it to a given shape of portion on the image memory so as to store it. Accordingly, it becomes possible to produce color changing images even if the color information is not inputted each time the coordinates of the image are inputted.

The present invention is to provide an image quality changing device, which comprises, as one preferred embodiment, a first image storing means for storing one picture-face portion of images, an image inputting means for inputting the images to the first image storing means, an image quality selecting means for selecting points to be changed in the image quality on the images, and element patterns for defining the image touches, an image processing means which reads out the color information to be stored in the image storing means corresponding to points on the image selected, and transfers it into the address within the range of the element pattern in accordance with the above-described points in a second image storing means, a display means for displaying the contents stored in the second image storing means for storing one picture-face portion of images, and the second image storing means.

EXAMPLE

The present invention will be described hereinafter in detail about many embodiments shown in the drawings.

Figure 2:
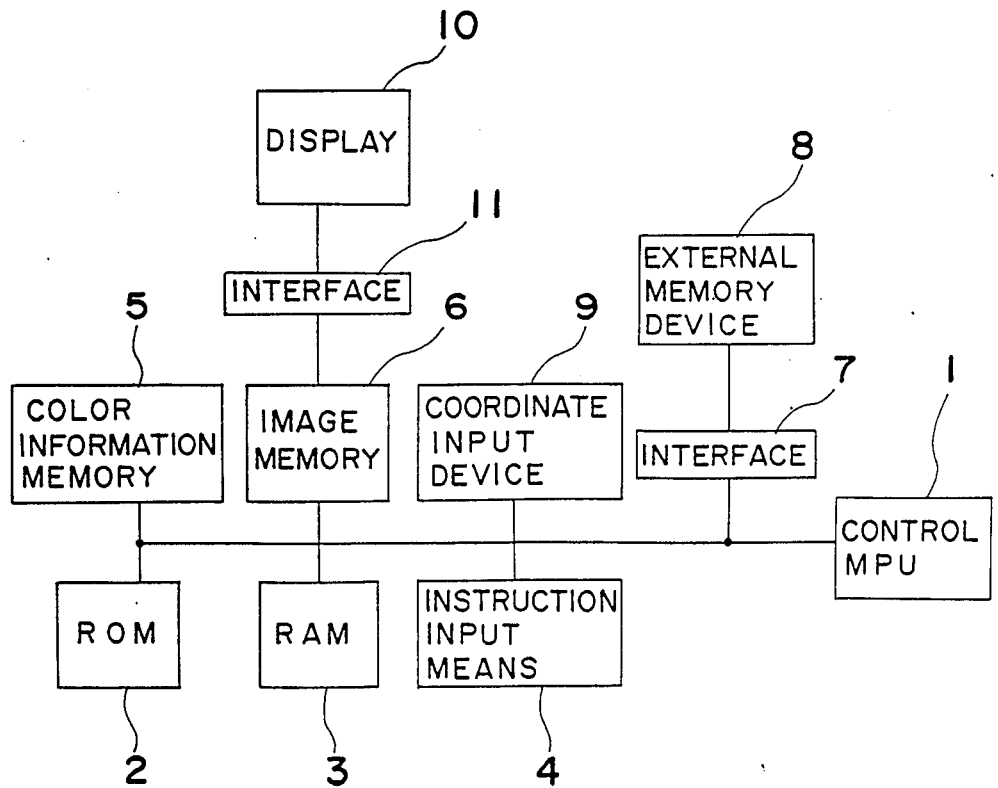
Figure 3:
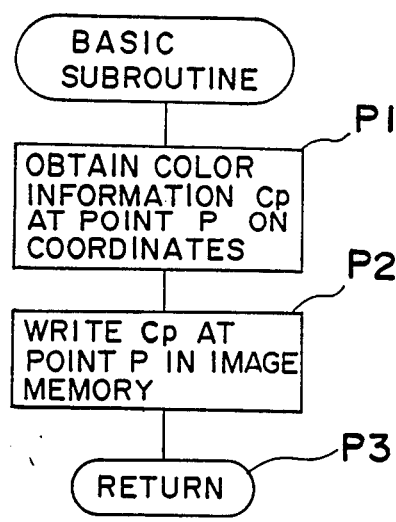
Figure 5:
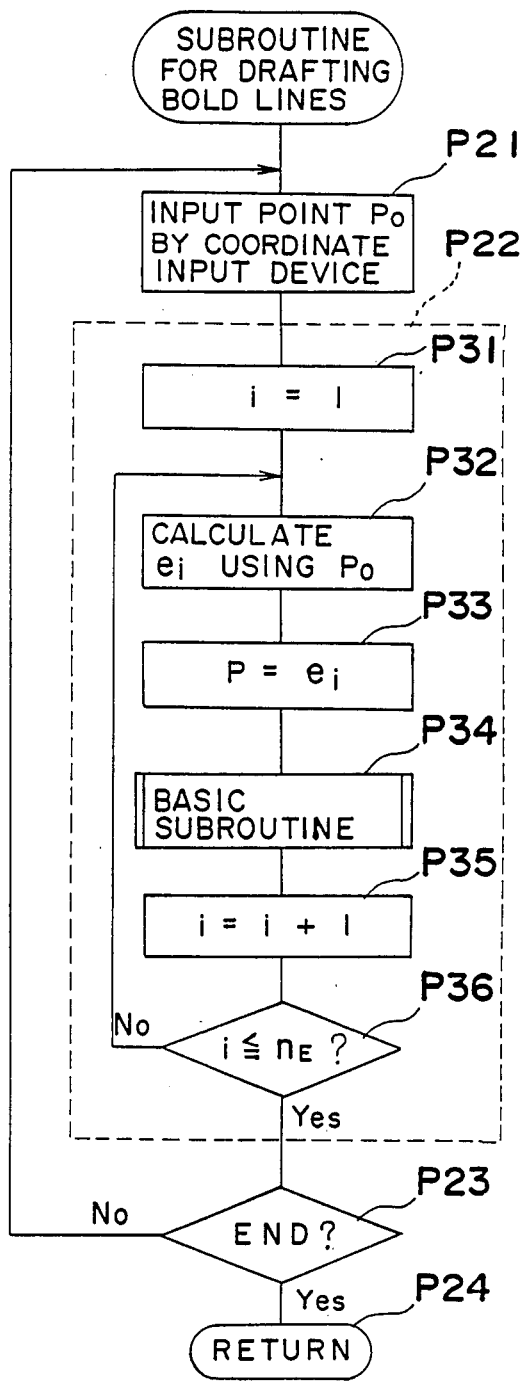
Figure 4:
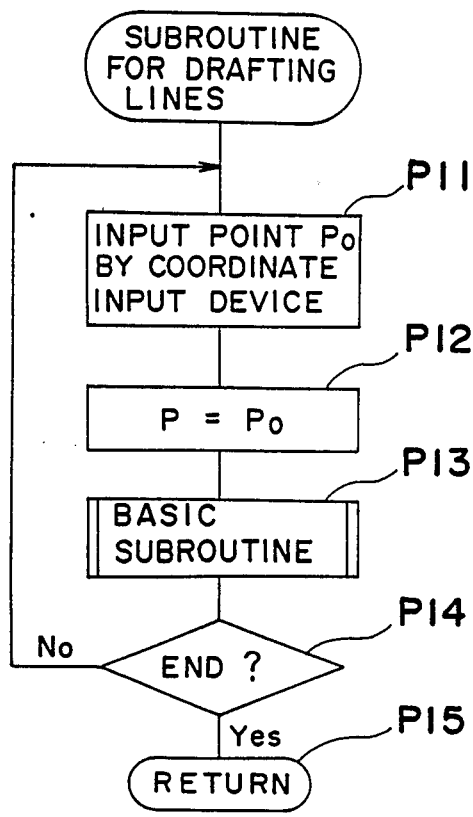

FIG. 1 is an entire block diagram in a first embodiment of the present invention, FIG. 2 is a block diagram of the embodiment of the present embodiment, FIG. 3 is a flow chart of a basic subroutine, which writes the color information in the coordinates specified on the picture face, FIG. 4 is a flow chart of a subroutine for drafting lines with hand writing, FIG. 5 is a flow chart of a subroutine for drafting bold lines with hand writing, FIG. 6 (a), (b), (c) and FIG. 7 (a), (b), (c) show forming examples of bold lines to be drafted in accordance with the present invention respectively.

Figure 8:
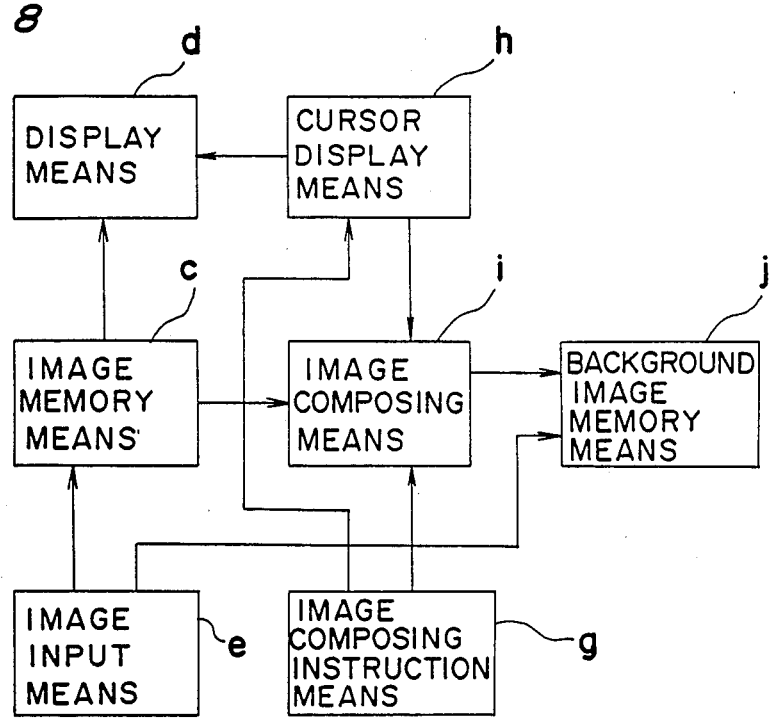
Figure 10:
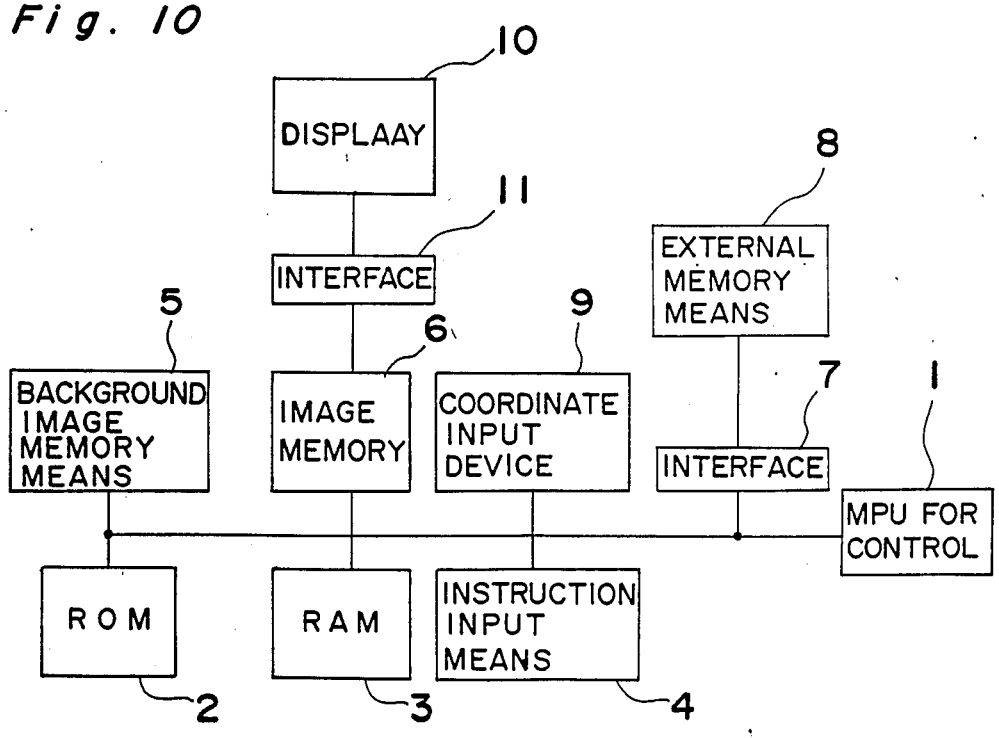

FIG. 8 is an entire block diagram for showing the construction of a second embodiment of the present invention, FIG. 9 (a) through (d) are views for illustrating the examples of composing the images in accordance with the present invention, FIG. 10 is a block diagram of an electronic image composing device, FIG. 11 is a flow chart of a basic subroutine, which transfers information from an image memory to a background image memory at a coordinate point P on a given picture face, FIG. 12 is a flow chart of a subroutine which successively composes images.

Figure 19:
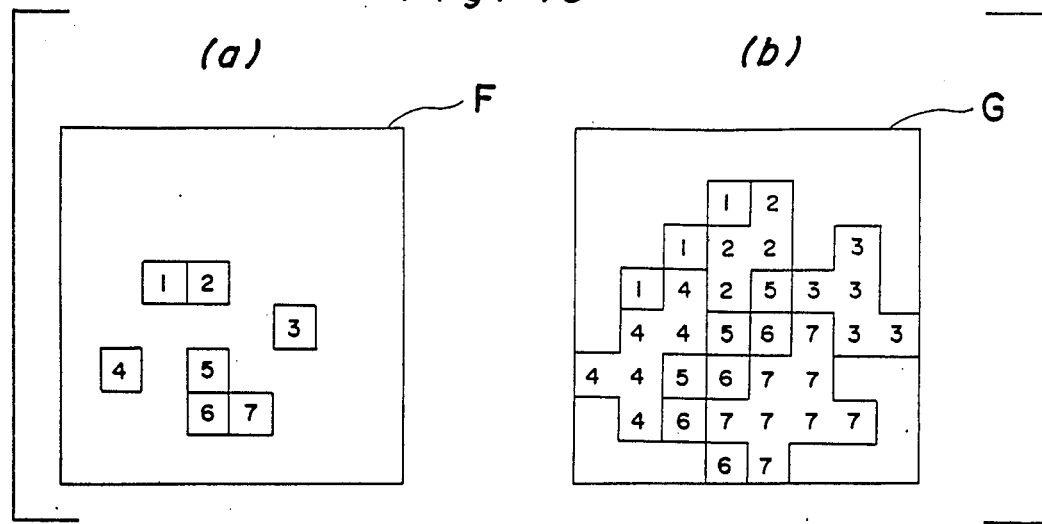
Figure 20:
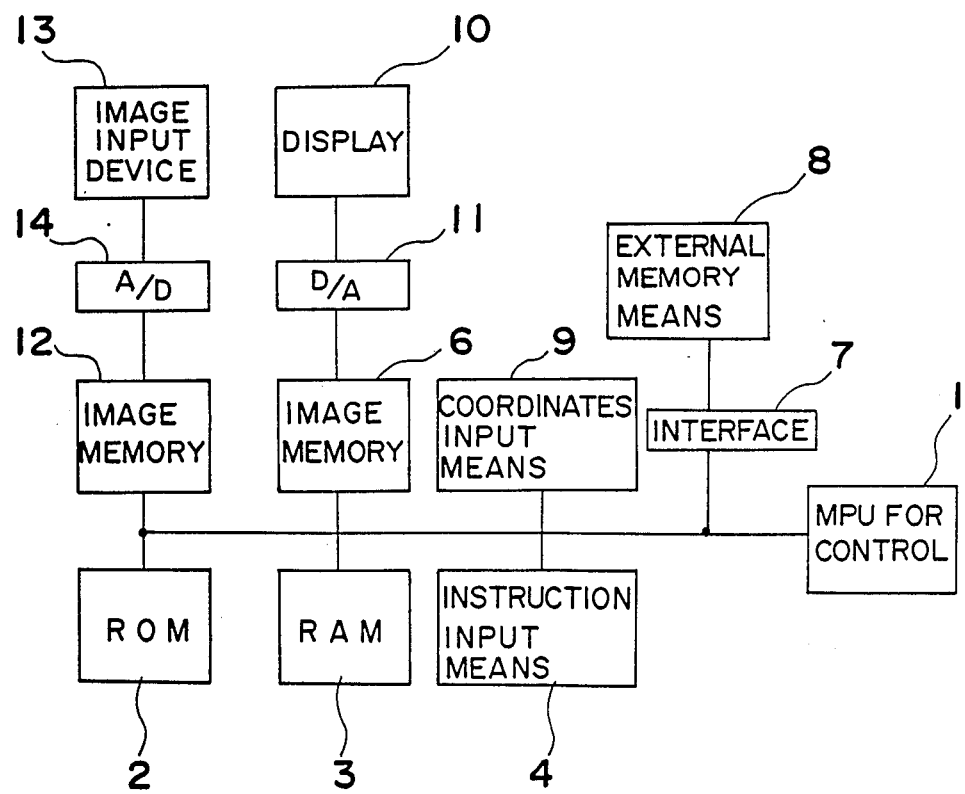
Figure 21:
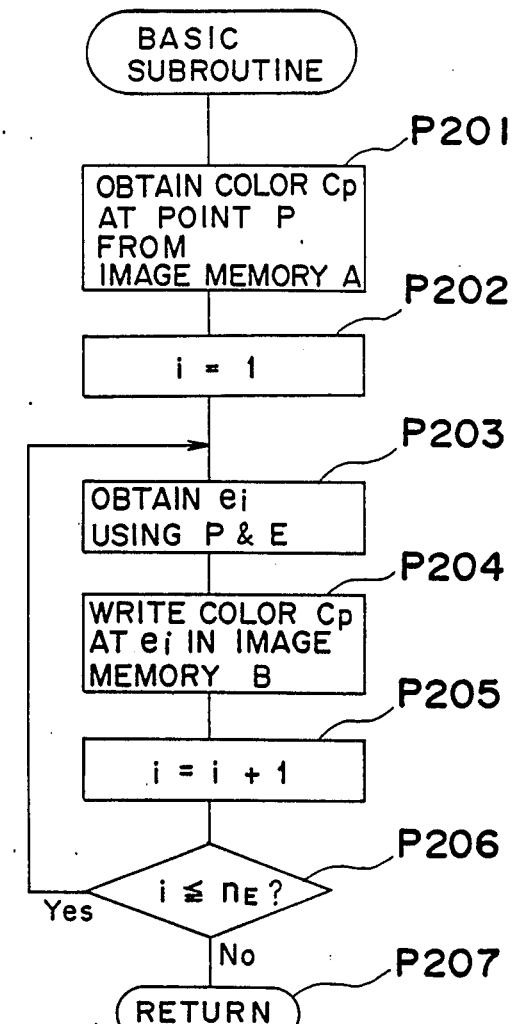
Figure 22:
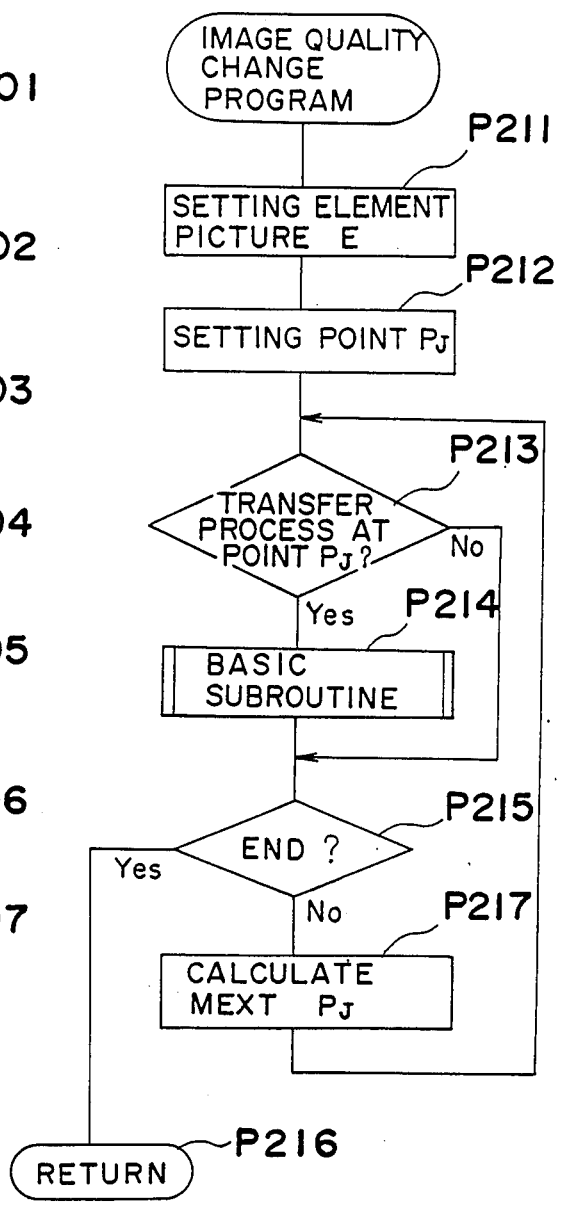

FIG. 13 is an entire block diagram of a third embodiment of the present invention, FIG. 14 is a view showing that the image is split into picture elements of m×n, FIG. 15 (a), (b), (c) are views for showing the characteristics of the images of the oil paintings, FIG. 16 is a view showing one example of an element pattern, FIG. 17 is a view for illustrating transfer processing, FIG. 18 (a), (b) are views showing an example wherein transfer processings have been performed on points $P_1$ and $P_2$, FIG. 19 (a), (b) are views showing an example wherein transfer processings have been performed on seven points, FIG. 20 is a block diagram in the embodiment of the present invention, FIG. 21 is a flow chart of a basic subroutine for performing the transfer processings, FIG. 22 is a flow chart of an image quality change for performing transfer processings on a plurality of points.

Figure 23:
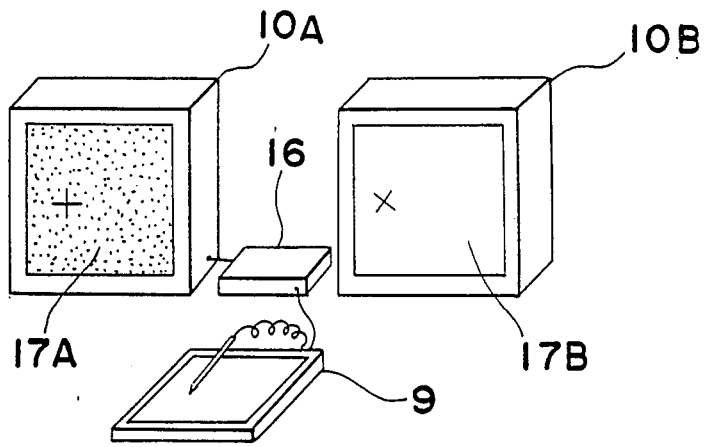
Figure 24:
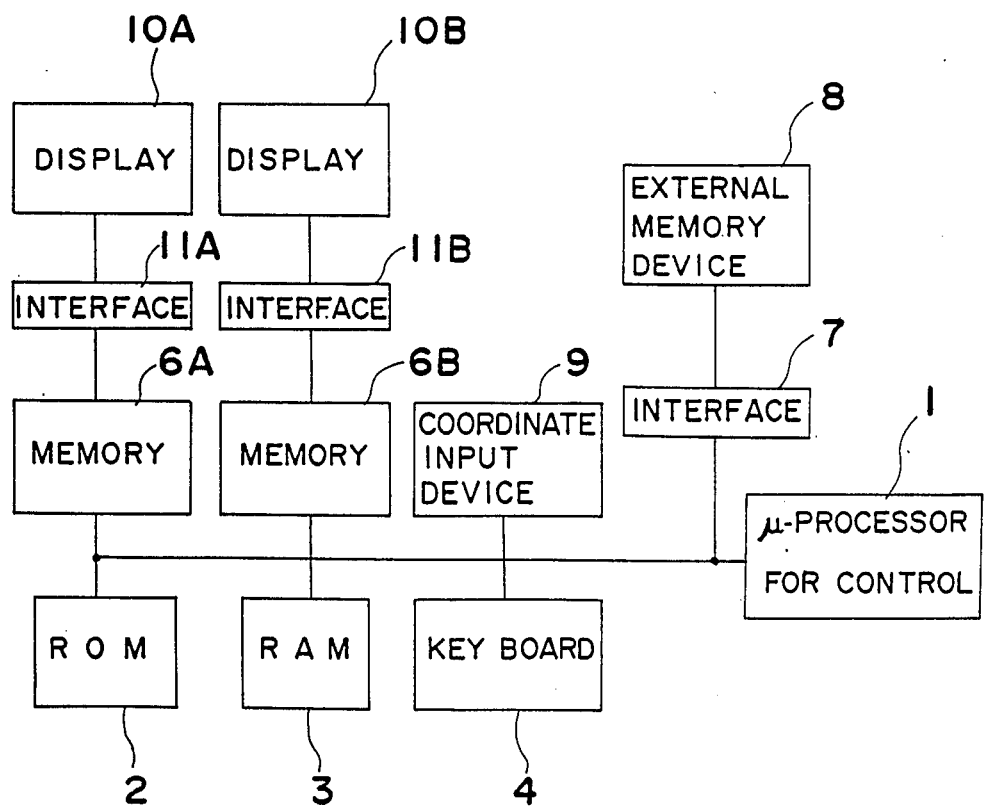
Figure 25:
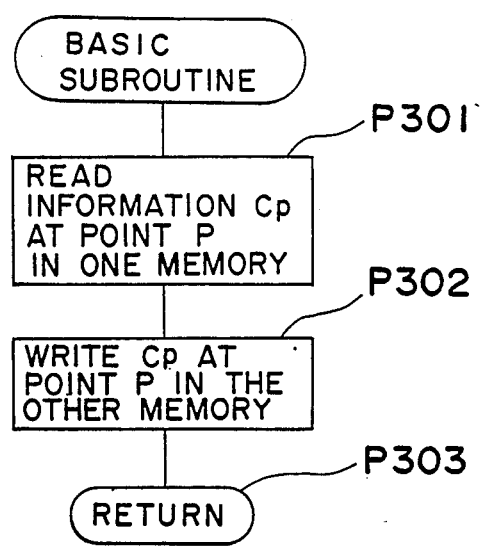
Figure 26:
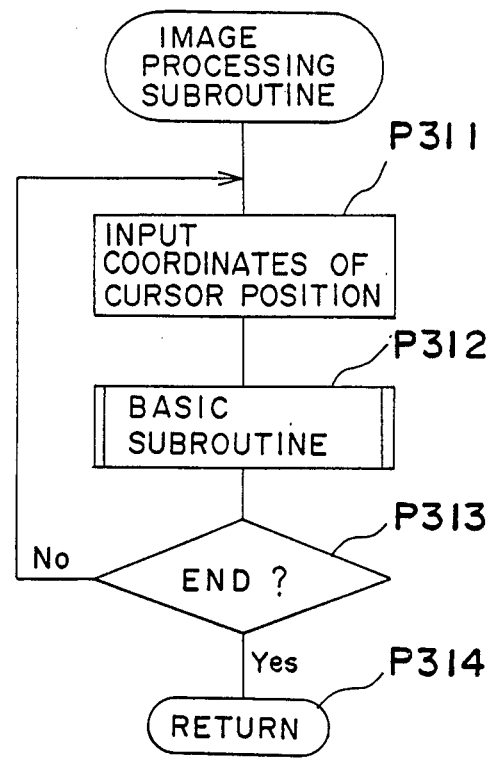
Figure 27:
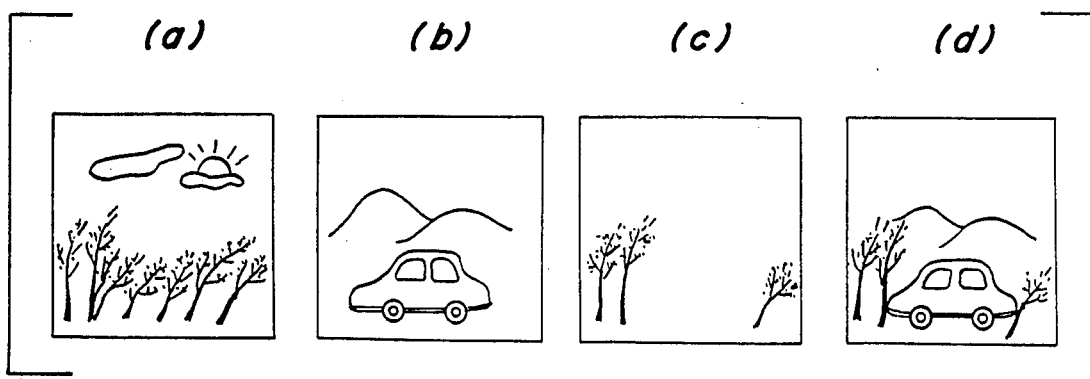

FIG. 23 is a construction view of a device showing a fourth embodiment of the present invention, FIG. 24 is a block diagram showing an electric circuit example, FIG. 25 is a flow chart for illustrating the operation of a basic subroutine, FIG. 26 is a flow chart for illustrating the operation of an image process subroutine, FIG. 27 (a), (b), (c), (d) are views for illustrating the operation of an image composing example.

Figure 28:
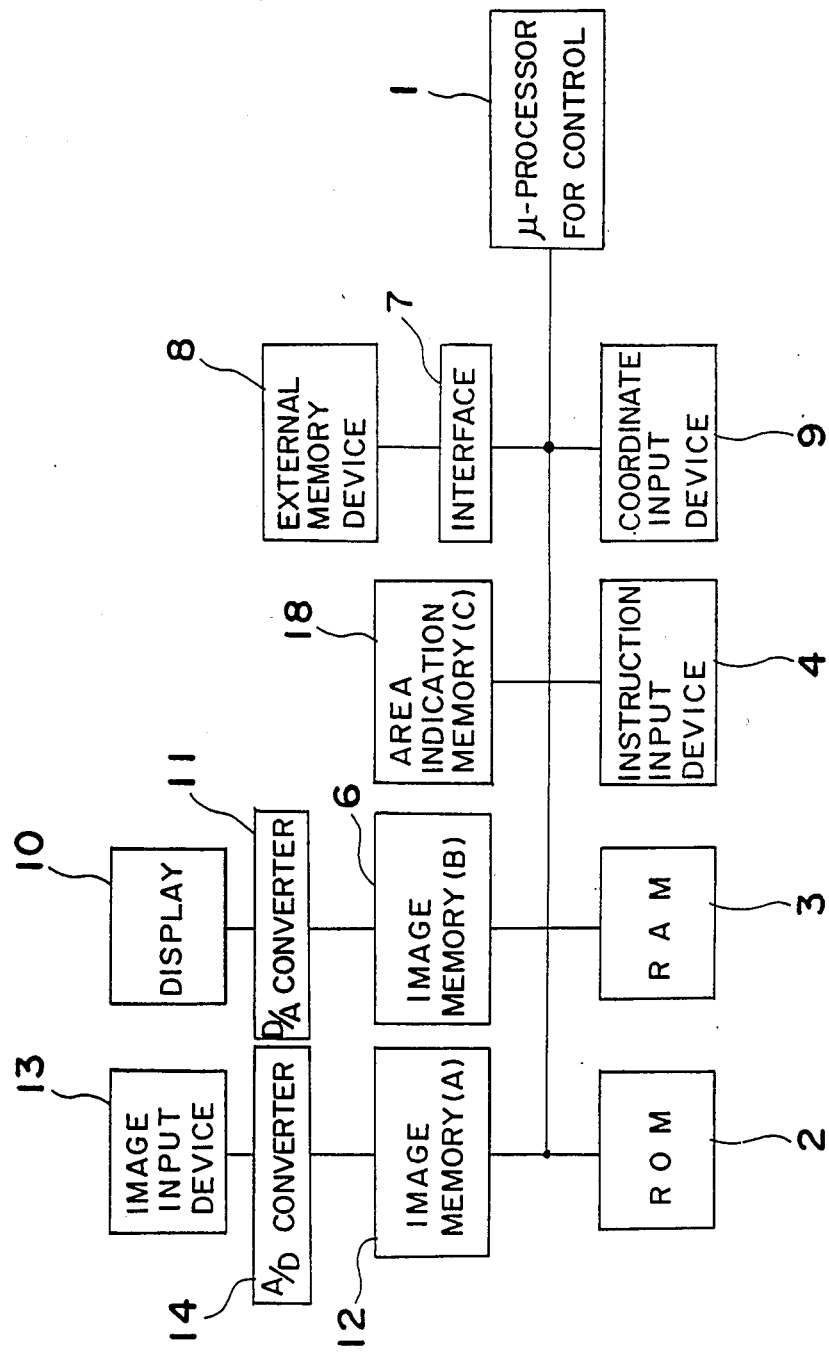
Figure 30:
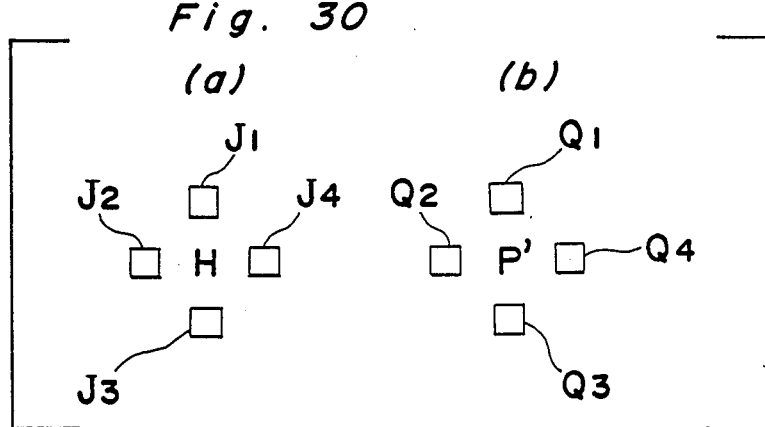
Figure 31:
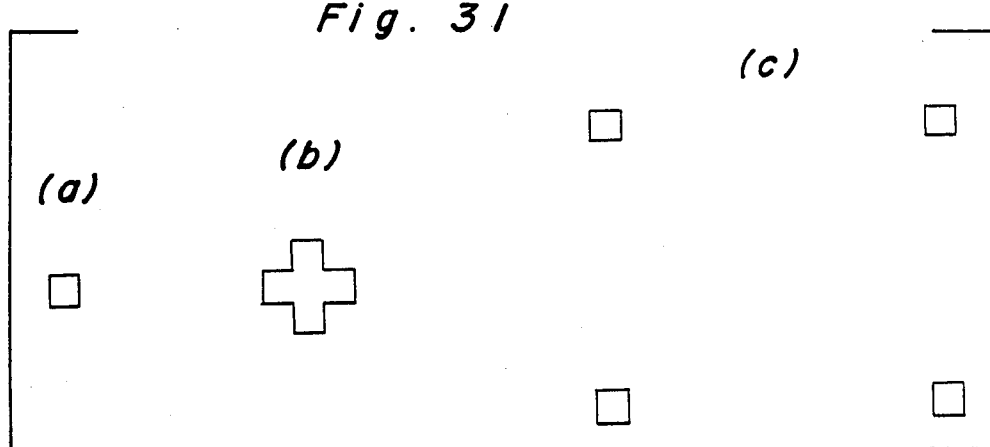
Figure 32:
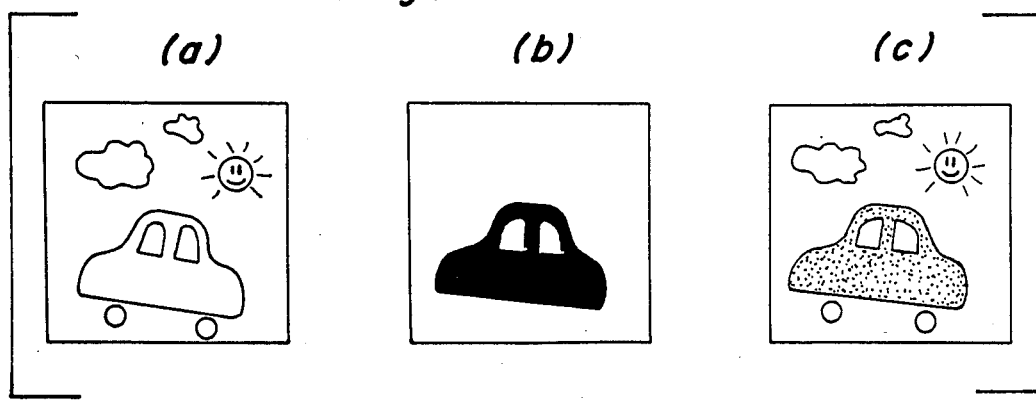

FIG. 28 is a block diagram showing a fifth embodiment of the present invention, FIG. 29 is a flow chart for illustrating the operation, FIG. 30 (a), (b) are views for illustrating the relationship between the processing points and element patterns, FIG. 31 (a), (b), (c) show element pattern examples, FIG. 32 (a), (b), (c) are views for illustrating the embodiments of image processings.

Figure 33:
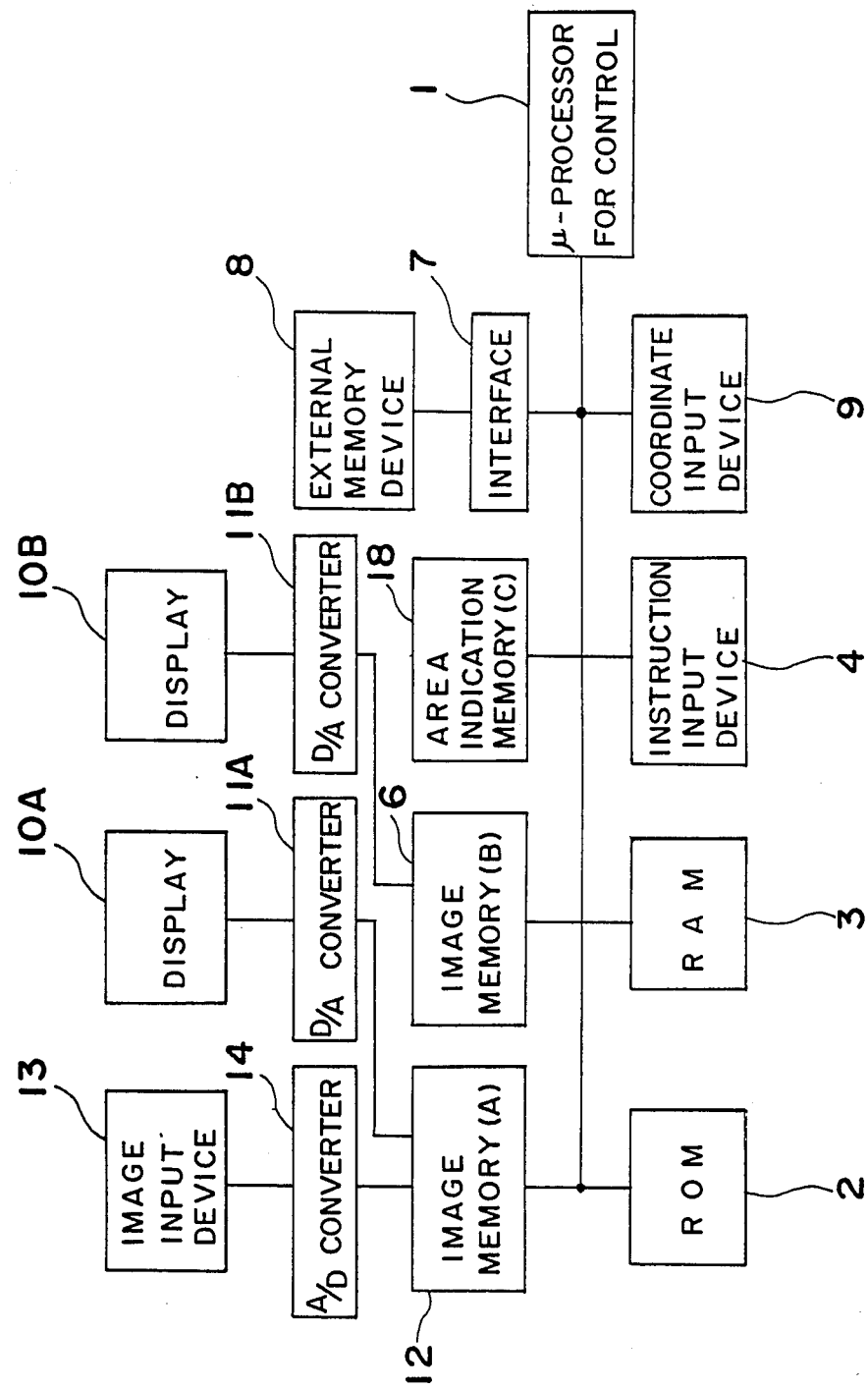
Figure 35:
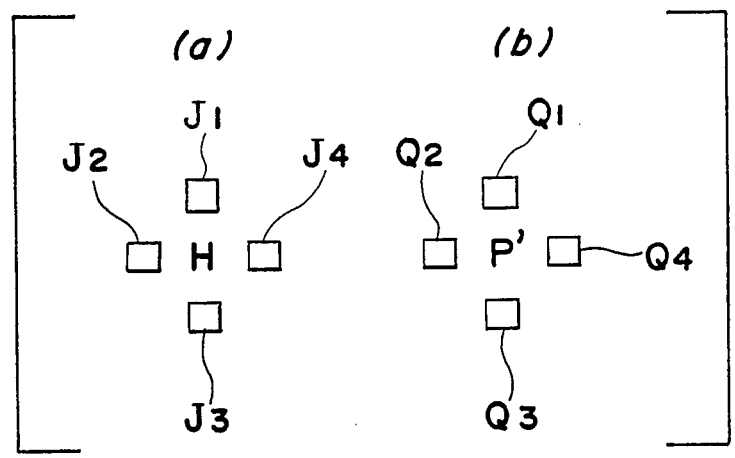
Figure 36:
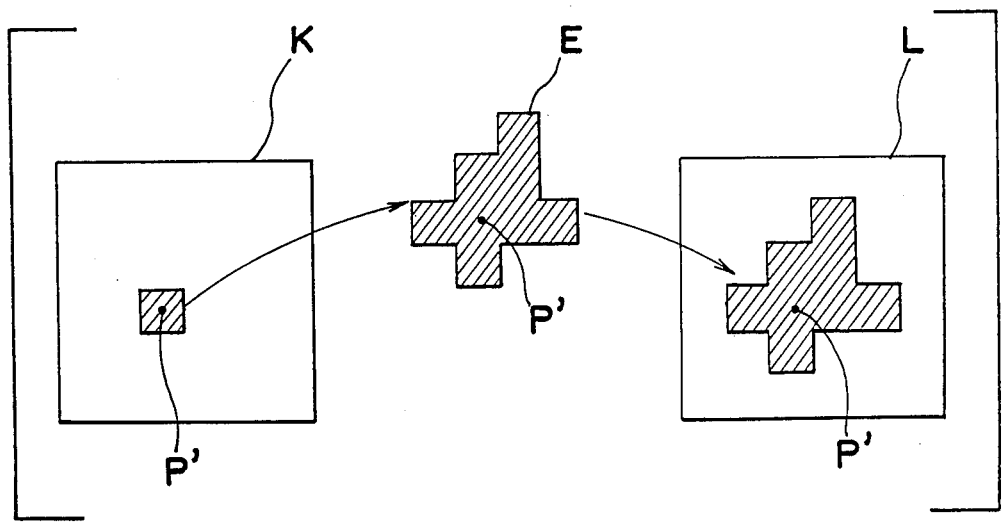

FIG. 33 is a block diagram showing additionally functions of the present invention, FIG. 34 is a flow chart for illustrating the operation, FIG. 35 (a), (b) are views showing the relationship between the processing point Qi and the element pattern, FIG. 36 is a view showing the relationship between a scanning point P' to be processed and a processing point Qi (element pattern), FIG. 37 (a), (b) are views showing the processings in seven scanning points P', FIG. 38 (a), (b) are views showing the processings in five scanning points P', FIG. 39 (a), (b) are views for illustrating the processings through changes in the scanning sequence by the comparison with FIG. 37 (a), (b).

Figure 40:
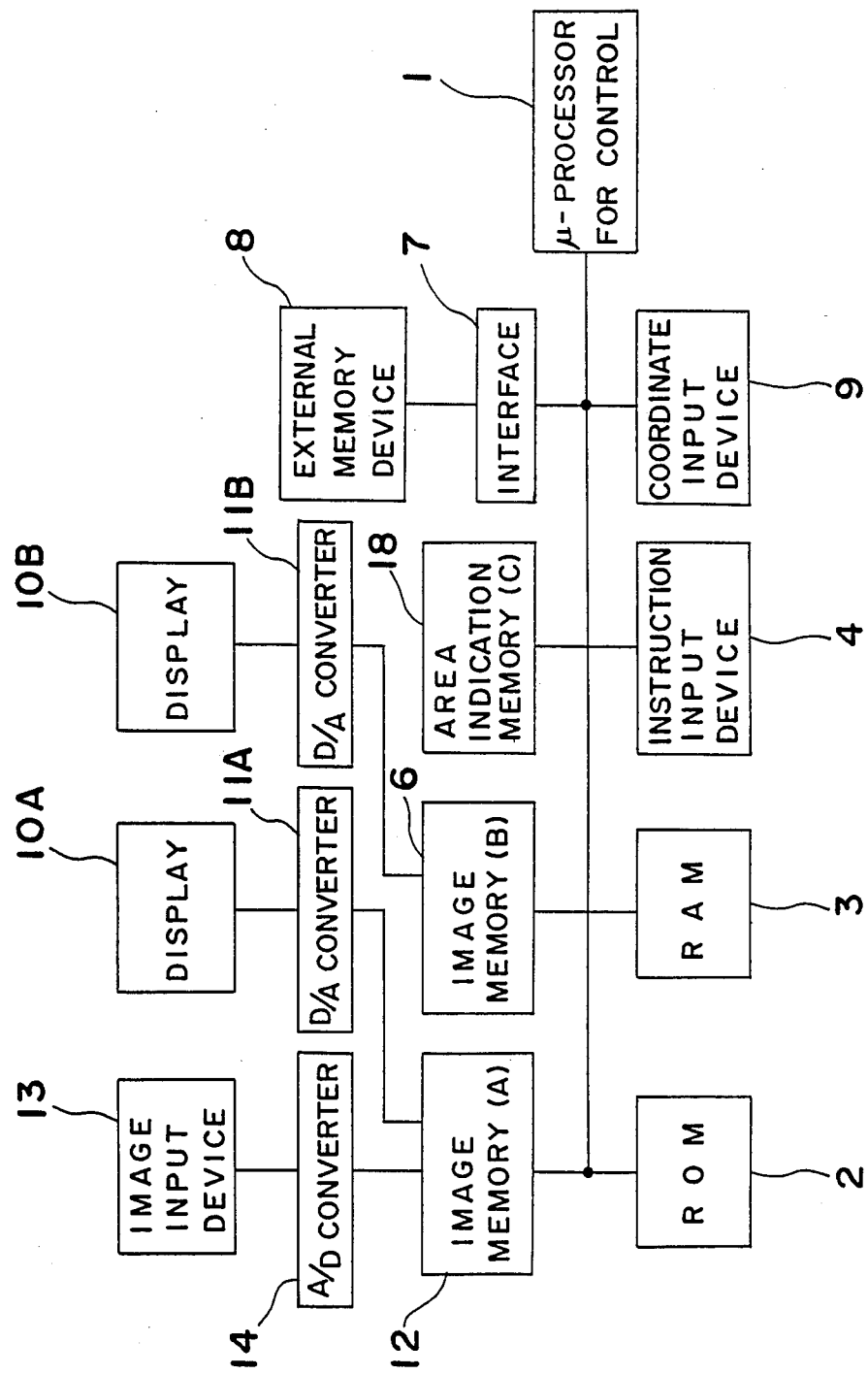
Figure 41:
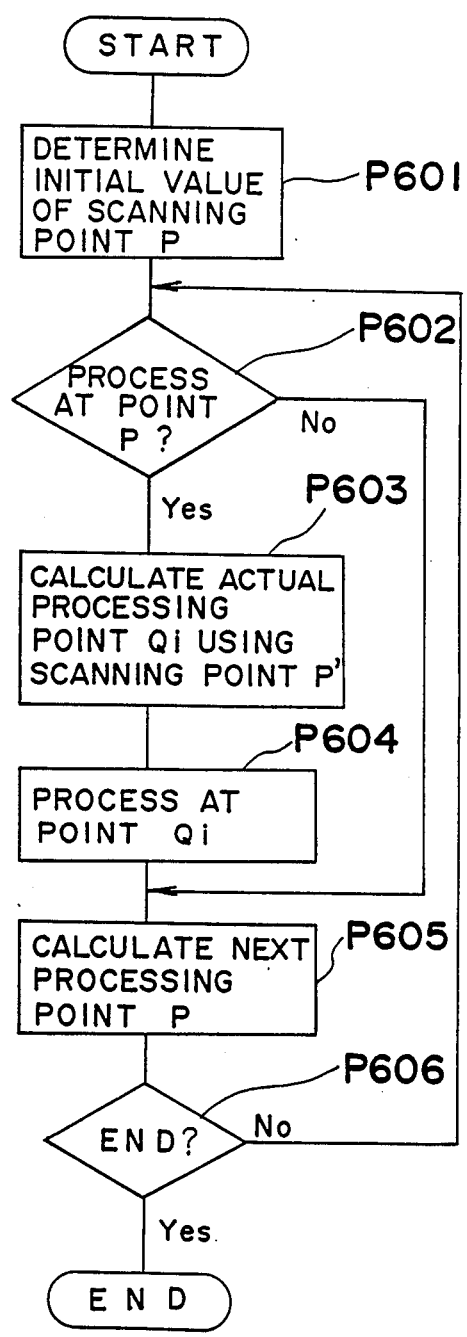
Figure 47:
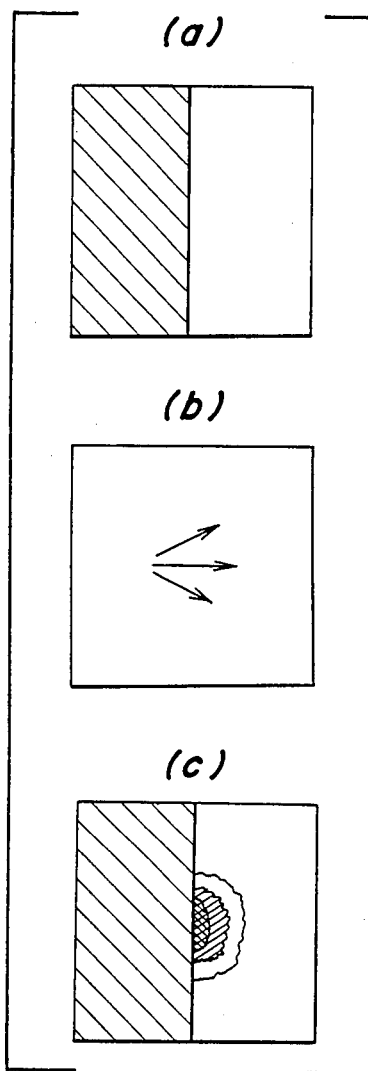
Figure 42:
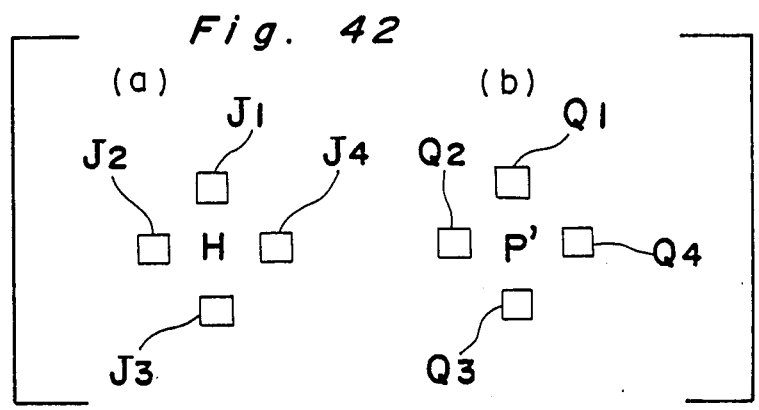
Figure 43:
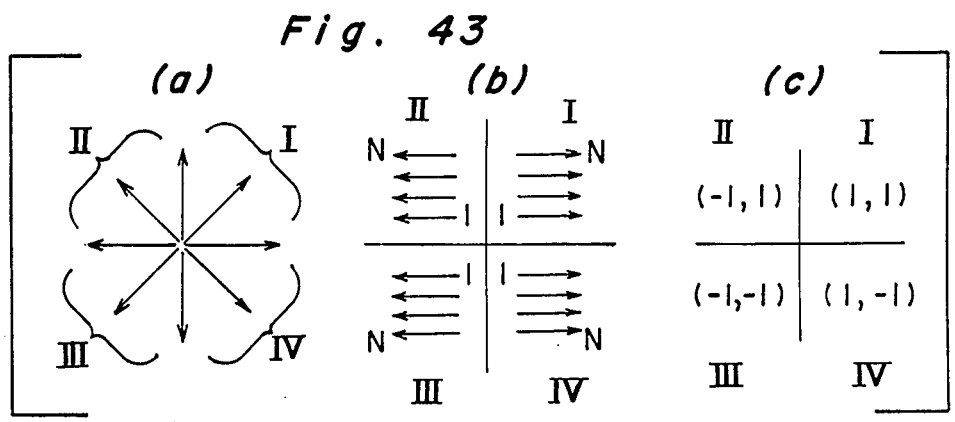
Figure 48:
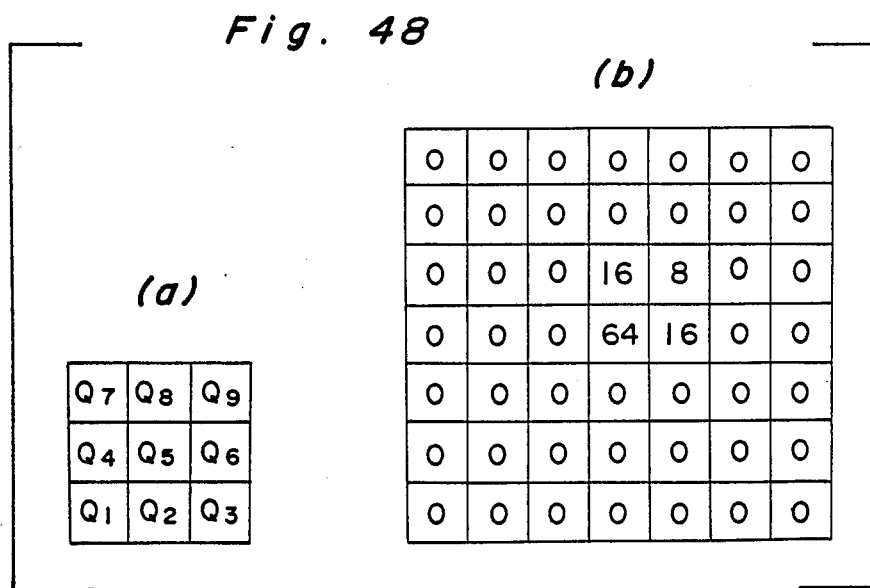

FIG. 40 is a block diagram of a seventh embodiment of an image processing device in accordance with the present invention, FIG. 41 is a flow chart for illustrating the operation, FIG. 42 (a), (b) are illustrating views of the scanning direction, FIG. 43 (a), (b), (c) are illustrating views of vectors, FIG. 44 (a) are a view for illustrating the image information, FIG. 44 (b) is a view for illustrating an element patterns, FIG. 45 (a) is an illustrating view showing the sequence of the processing points, FIG. 45 (b) is a view for illustrating the processed results, FIG. 46 (a) is an illustrating view showing the sequence of the processing points, FIG. 46 (b) is a view for illustrating the processed results, FIG. 47 (a), (b), (c) are illustrating views of the image processings, FIG. 48 (a) is an illustrating view showing the sequence of the processing points, FIG. 48 (b) is an illustrating view of the processed results.

The like component parts are designated by like reference numerals throughout the respective drawings to omit the description thereof.

(First Embodiment)

A first embodiment of the present invention is shown in FIG. 1 through FIG. 7.

FIG. 1 is an entire block diagram for illustrating the construction of the present invention. An image producing device of the present invention, which is composed of a color information storing means a for storing the color information corresponding to one picture-face portion, a color information inputting means b for inputting in advance the patterns of the picture-face colors to the color information storing means a, an image storing means c for storing the information of images corresponding to one picture-free portion, a display means d for displaying images stored in the image storing means c, an image coordinates inputting means e for inputting the coordinates of images to be painted, an image inputting means f for writing in the coordinates within the given shape in accordance with the above-described inputted coordianates of the image storing means b, is capable of drawing images, whose colors change depending upon locations, only by inputting the coordinates of the images to be drawn, in accordance with the color patterns of the images stored in advance in the color information storing means a.

An image producing device in an embodiment of the present invention is shown in FIG. 2. In the present device, a microprocessor 1 for control use, a ROM 2 for storing controlling programs or the like, a RAM 3 for storing variables to be used during the controlling operation, and an instruction inputting means 4 such as keyboard or the like for inputting instructions for control use are connected mutually through a bus for use in the control of the image production. Furthermore, the bus has a color information memory 5 wherein color information corresponding to each picture element of one image portion is stored in advance, an image memory 6 wherein the color information corresponding to each picture element of one image portion can be stored, and extremal memory device 8 using memory media such as cassette tape, floppy disc, hard disc or the like for storing the image data through an interface 7, a coordinate inputting device 9 such as light pen, digitizer or the like for inputting the coordinates of images connected thereto. A display device 10 such as CRT or the like for displaying the color information accommodated in the image memory 6 is connected with the image memory 6 through an interface 11.

Then, one example of the controlling program accommodated in the ROM 2 will be described with reference to the flow charts shown in FIG. 3 through FIG. 5.

FIG. 3 is a flow chart of a basic subroutine for writing the color information in coordinates given on the picture face. When the subroutine is used, a coordinate value P is given in advance. First, an address on the color information memory 5 corresponding to the coordinate value P given is calculated to draw out (step P1) the color information $C_p$ in this address. Then, the address on the image memory 6 corresponding to the coordinate value P is calculated to write (step P2) the color information $C_p$ obtained at the step P1. And it returns to the main program (step P3).

FIG. 4 is a flow chart of a subroutine for drafting lines with the hand writing using the basic subroutine shown in FIG. 3. At first, a coordinate $P_0$ at one point of the image to be drawn is inputted (step P11) from the coordinate inputting device 9 such as light pen or the like. The coordinate point $P_0$ is substituted for P (step P12) to execute the basic subroutine (step P13) to store the color information $C_p$ corresponding the coordinate $P_0$ of the image memory 6. Then, it is decided (step P14) whether or not the line drafting has been completed. When the completion has not been decided, it returns to the step P11 to input the next coordinate to continuously keep drafting the lines. When the completion has been decided, it returns (step P15) to the main program. This decision is performed by judgment as to whether or not the terminal of a line established in advance has been reached or judgment as to whether or not a completion key of the image producing device has been depressed. In this manner, lines which have been colored with color information set by the color information memory 5 are drafted on the picture face 10.

FIG. 5 is a flow chart of a subroutine for drafting bold lines. To make the lines bolder, a certain pattern such as circle is required to be drawn with the coordinate of the inputted line as a center. Before the subroutine is used, the pattern is specified. At first, a coordinate value $P_0$ inputted from the coordinate inputting device 9 is read out (step P21). Then, a given pattern is drawn (step P22) with the coordinate $P_0$ as a center. Then, decision is performed as to whether the line drafting has been completed (step P23), when it has not been completed, it returns to the step P21, when the completion has been decided, it returns (step P24) to the main program (step P24).

Here, the step P22 is composed of the following steps in detail. Assume that the number of points composing a given pattern is $n_E$. Color information is transferred sequentially to this $n_E$ points. At first, a variable i for systematizing the n points is assumed to be 1 (step P31). Then, the coordinate ei of the ith (first at present) point of the given pattern is calculated (step P32). Concretely the relative coordinate data of a given pattern are stored in a table, the data are sequentially read out and are added to the coordinate $P_0$ thereby realizing it. The calculated coordinate ei is assumed to be P (step P33) and the color information is written (step P34) in this point ei with the use of the basic subroutine. Then, one i is added (step P35) to decide (step P36) whether i is $n_E$ or lower (step P36). When i is $n_E$ or lower, it returns to the step P32 to keep drawing a given pattern. When the i exceeds the $n_E$, it proceeds as the drawing completion of the given pattern. In this manner, several points around it may be drawn only by the inputting operation of the coordinate $P_0$ of one point at the step P22, so that the bold lines can be drawn. Also, if the given pattern is varied in size, the thickness of the line can be varied.

The subroutines (FIG. 4, FIG. 5) for drafting the above lines are applied in a case where the lines are written with the hand writing, but the color may be gradually changed, the patterns may be given depending upon the locations or the patterns may be varied in size depending upon the locations likewise when a straight line or a circular are connecting between two points are drawn or when the interior within the closed curve line is smeared out.

For example, a method of calculating and writing the data by a microprocessor 1 for control use, or a method of reading and inputting the patterns with a video camera or the like are provided as a method of inputting the color patterns of the color information memory 5. The former is suitable for comparatively easy patterns such as pattern to be gradually varied in color, pattern of repeating design. Also, the latter may be applicable to anything if it can be photographed with a video camera.

If the contents of the color information memory 5 are displayed as they are on the display 10, the pattern of the established color may be easily known. In an image producing device shown in, for example, FIG. 2, the contents of the color information memory 5 may be displayed on the display 10 when the contents of the color information memory 5 are replaced by the contents of the image memory 6.

Examples of bold lines drafted in accordance with the present invention are shown in FIG. 6 and FIG. 7. Here, the patterns A, A' shown in FIG. 6 (a), FIG. 7 (a) are the patterns of the colors stored in advance in the color information memory 5. The pattern A is a pattern in which the color gradually changes from left to right at six stages, the pattern A' is a checkered pattern. Locusci 41, 51 which have been inputted by the handwriting inputs are respectively shown in FIG. 6 (b), FIG. 7 (b). The patterns 42, 52 which have been inputted in the image memory 6 by the use of a subroutine drafting bold lines are shown correspondingly in the B, B' shown in FIG. 6 (c), FIG. 7 (c). The patterns 42, 52 of the bold lines on the image memory 6 reflect the patterns of the color information stored in advance in the color information memory 5. Images of lines, circles or the like which change in color depending upon locations may be easily drafted by the use of an image producing apparatus, of the present invention, of such construction as described hereinabove.

Therefore, the expression capability of the image producing device may be considerably improved.

(Second Embodiment)

A second embodiment of the present invention will be shown in FIG. 8 through FIG. 12.

FIG. 8 is an entire block diagram for illustrating the construction of the present invention. An electron image composing device in accordance with the present invention is composed of a background image storing means j for storing background images corresponding to one picture face portion, an image storing means c for storing means to be composed in the background images, an image inputting means 6 for inputting images and background images respectively to the image storing means c and the background image storage means j, a display means d for displaying on the picture face the images stored in the image storing means c, a cursor display means h for displaying the cursor in the optional point on the picture face, an image composing means i for reading out the color information stored in an image storing means c corresponding to a point displayed by the cursor on the picture face to cause this color information to be stored in a corresponding point of the background image storing images j, a composing instruction means 9 for instructing an image composing position to the above-described cursor display means h and instructing the image composition to the image composing means i when the cursor is located in a position specified by the cursor, the images are cut at each of points to be specified by cursor on the picture face so as to compose with the background images on the background image memory means j.

The image composing system in accordance with the present invention, which is different from the conventional image composing system, depends upon the processing of transferring to the background image one by one points desired to be composed. This will be described with the used of FIG. 4. The branches and leaves of slender trees which have been difficult to be composed by the conventional composing method as an example in the original images stored in the image memory are painted in FIG. 9(a). When the trees are cut down to compose them in the background image (background memory) of FIG. 9(B), a coordinate point P with trees provided therein is inputted, first, by the use of the coordinate input means. And by the processing of the microprocessor, the color information of the memory corresponding to a P point of the image memory, i.e., the color of the tree is drawn out and is written in the memory corresponding to the P point of the background image memory. It follows that the composition from the image memory to the background image memory has been performed at one point P in the processing up to here. If the coordinates are inputted as the tree is traced by the use of a coordinate inputting means through repetition of this operation, it is possible to cut down the trees to compose them in the background image. This situation is shown in FIG. 9(c), (d). FIG. 9(c) is a coordinate inputted and FIG. 9(d) is a composed image.

In the system of the present invention, it is possible is to pick up only one point and to make composition in principle. Also, there is no difficulty even if the composing points are scattered separately. As a result, it is possible to cut down lines, points, if extremely fine, to compose them on the background images.

To correctly input the points to be composed, it is required to display cursor on the display the point to be inputted from the coordinate input means through the displaying of the images of the image memory on the display. Thus, the operation is extremely simplified, because the necessary thing is that the cursor has to be brought to a point to be composed.

Also, another system is required to be used when a location where images to be be cut down exist is different from a location where the images are to be fixed. Namely, move in advance the images to be cut down on the image memory to suit a location to be fitted. In this case, as a wide range such as rectangular unit containing the entire image to be out down is required to be moved, but the images to be cut down are not required to be correctly cut down and to be moved, the operation is simplified. After an aligning operation in this manner, the composing operation is required by the use of the system of the present invention. The cases where rotation, construction, enlargement, inversion or the like are accompanied may be processed in the similar system.

An electronic image composing device in the embodiment of the present invention is shown in FIG. 10. In the present device, a controlling microprocessor 1, a ROM 2 for storing a controlling program, etc., a RAM 3 for storing variables to be used during the controlling operation, a keyboard 4 for inputting the controlling instructions are mutually connected through a bus for the use in the controlling operation of the image composition. A background image memory 5 for storing one image portion of background images, an image memory 6 for storing the images to be composed in the background images, an external storing means 8 wherein the image data are stored by the use of storing mediums such as cassette tape, floppy disk, hard disk or the like through an interface 7, an coordinate inputting means 9 such as light pen, digitizer or the like for inputting the coordinates of the cursor are further connected to this bus. A display means 10 such as CRT or the like for displaying the color information accommodated in the image memory 6 is connected with the memory 6 for storing the images through an interface 11. It is to be noted that in this embodiment, the images are adapted to be inputted from the external storing means 8, but it is considered that the images are adapted to be inputted directly from a television camera or the like. Also, if the contents of the background image memory are replaced by the contents of the image memory, the contents of the background image memory may be displayed on the display means 10.

Examples of flow charts for processing the image composition are shown in FIG. 11 and FIG. 12.

FIG. 11 is a flow chart of a basic subroutine which transfers the information from the image memory to the background image memory at a given coordinate point P. An coordinate value P is given as input. First, an address on the image memory corresponding to the coordinate value P is calculated to obtain (step P101) the information $C_p$ at this point. Then, the address on the background image memory corresponding to the coordinate P is calculated to write (step P102) the information obtained at the step P1 in this memory. And the step returns to the main routine (step P 103).

FIG. 12 is a flow chart of a subroutine which sequentially composes the images by the use of the basic subroutine. First, the coordinate point P which performs the composition is inputted simultaneously to display (step P111) the cursor on the point P. Then, the images are transfered (step P112) to the P point of the background image memory by the use of the basic subroutine. Then, whether or not the composition processing is completed is decided (step P113). This decision is performed through detection as to whether or not the completion instructions have been inputted by, for example, an instructions inputting means. When the composition processing has not been completed, the step returns to the step P111. When the composition processing has been completed, the step returns at the next step P114 to the main program.

When an electronic image composing device of such construction as described in accordance with the present invention is used, the image of one-dot unit may be composed, and accordingly the correct of complicated shape and the inserting composition into the background images may be performed, which have been impossible to be performed through cutting operation by the conventional closed curve.

(Third Embodiment)

A third embodiment of the present invention will be shown in FIG. 13 through FIG. 22.

FIG. 13 is an entire block diagram for clearly showing the construction of the present invention. An image quality changing device of the present invention is composed of a first image storing means k for storing one picture-face portion, an image inputting means e for inputting the images to the first image storing means k, an image quality selecting means p for selecting points to be changed in quality on the images and element patterns for defining the touched of the images, an image processing means 1 which read the color information stored in the first image storing means k corresponding to the points on the selected images to transfer to a second image storing means c to the address within the address of the above-described element pattern in accordance with the above-described points, a second image storing means c for storing one picture-face portion of images, a display means d for displaying the contents stored in the second image storing means c.

The original images inputted by a television camera or the like are A/D converted so that the data are normally decomposed into picture elements of m×n as shown in FIG. 14 and are stored in the first image memory. Namely, the smallest unit of the image is rectangular. However, the smallest unit of brush-written picture such as oil painting is not rectangular. How draw a dot with colors of uniform color being contained in the brush, and the dot appears as in, for example, FIG. 15(a). This shape changes variable, depending upon a way of moving the brush, a way of using the brush, or the like. Also, in the drawing by the brush, different colors are overlapped. When the drawing is added with a different color on FIG. 15(a), FIG. 15(b) is provided. In this way, the thing drawn with a color, at first, in such a range as shown in FIG. 15(a) comes to change in such a change as shown in FIG. 15(c). The characteristic of images like oil painting as described hereinabove is that the same color region (which is temporarily referred to as image unit) has limitless patterns although it is constantly rectangular in the original images inputted by a television camera.

The other characteristic is that the touches unique to brush are provided if the limitless patterns are provided. For example, the image unit is clearly different between the oil painting and the paste. Thus, to change the touches of the original images, the image unit is required to be changed from the rectangular shape to the other shape. Furthermore, the shape is not constant depending upon the location and is required to be complicatedly varied. The variation is required to have certain peculiar regularity, instead of complete random numbers. When the variation processing is performed to satisfy the above, it is possible to automatically change the touches.

Then, an actual system of performing such processing will be described. First, as shown in FIG. 16, a pattern (thereinafter referred to as element pattern) E upon which the touch is based is defined. In this example, the element pattern E is composed of eight units each being a unit of square picture element and the relative position of each picture element is defined with the picture element shown with a dot O provided as a base.

The transfer processing will be described hereinafter with the use of FIG. 17. A first image memory F stores original images. The image quality is assumed to change with a point P of the original image provided as a center. First, the color information is read from the point P. The element pattern E of the color is composed to write this element pattern E with the point P of the second image memory G provided as a center. This processing is called transfer processing.

To provide touch-changed images from the original images, the above processing is performed on the entire picture face. FIG. 18(a), (b) show the results provided through the transfer processing in the order of $P_1$, $P_2$ with respect to the points $P_1$, $P_2$ on the memory. As shown in FIG. 18(b), one portion of the region $E_1$ which has the color of the point $P_1$ previously transferred is replaced by the element pattern $E_2$ which has the color of the $P_2$ transferred later, thus leaving only one portion (which is shown with hatching) of the left. Also, FIG. 19(a), (b) show the results provided through the transfer processing performed with respect to seven points on the image memory F. If the transfer processing is performed upon points properly spread on the image memory F like this, the new quality images which have the color on the image memory F and the partial shape of the element pattern can be provided on the image memory G.

The image unit of the images on the image memory G is one portion of the element pattern and the portion of the image unit, the size thereof may be variably changed because of the distribution and the order of the points for performing the transfer processing. Also, if the points for performing the transfer processing are made high in density, the size of the image unit on the image memory G becomes small to provide extremely fine images and if they are made low, rough images are provided. The image unit is determined in shape by the external shape of the element pattern, because one portion of the element pattern becomes a shape cut down by the other element pattern. Namely, the shape of the image unit, i.e., the touch may be determined by the element pattern.

FIG. 20 is a block diagram in the embodiment of an image processing device of the present invention. A controlling microprocessor 1 for controlling the image-quality change is connected through a bus with a ROM 2 where the controlling program is accommodated, a RAM 3 for storing the controlling variables, an instructions inputting means 4 such as keyboard or the like for inputting the controlling instructions. Furthermore, a first image memory 12, a second image memory 6, and an external storing means 8 such as floppy desk, hard disk or the like through an interface 7 are connected with this bus. To input the instructions, a system of operating the cursor to select the instructions from the displayed menu may be used by an coordinates inputting means 9 such as digitizer, tablet or the like. An image inputting device (here video camera) 13 for inputting original images such as television camera, video camera, television tuner, video disk player or the like inputs the original images to the image memory 12 through an A/D converter 14. Also, the display 10 displays the contents of the image memory 16 through a D/A converter 11 which makes conversion into video signals. It is to be noted that a memory for display use may be provided in particular.

FIG. 21 is a flow chart of a basic subroutine for transfer processing. A coordinate P and an element pattern E are given as inputs. The number of the picture elements constituting the element pattern E is $^nE$. The data of the element pattern E is stored in advance in a table so that the coordinate of each point of the element pattern can be calculated through selection of the data from in the table. First, color information $C_p$ is read (step P201) from an address corresponding to a point P on the image memory 12. Then, a coordinate of the i th point of the element pattern E in a case where the element pattern E has been placed around a point P is sequentially calculated. First, to specify the order, the initial value of i is assumed to be 1 (step P202). Then, a coordinate ei of the i th point in a case where the element pattern E has been placed around a point P is calculated (step P203). Then, the color information $C_p$ is written (step P204) into an address corresponding to the coordinate ei on the image memory 6. Then, i increases by 1 (step P205). It is decided (step P206) whether or not the i is $^nE$ or less. During $i \leq n$, the step returns to the step P203 to transfer the color information to the image memory 6. During $i > {^nE}$, the transfer processing is over so that the step returns to a main routine (step P207).

FIG. 22 shows a flow chart in one example of a subroutine of the image change using a basic subroutine. First, an element pattern E is set (step P211), then an initial value Pj of the scanning P is set (step P212). Then, whether or not the transfer processing is performed at a scanning point Pj is decided (step P213). This decision determines the kind of the distribution in the transfer processing. In the simplest example, the transfer processing is performed at a rate of one per four points in terms of random numbers. Here when the transfer processing is judged to be performed, the transfer processing is performed (step P214) by a basic subroutine of the transfer shown in FIG. 20. When the transfer processing is judged not to be performed, the step skips this step P214 to move to the next step. Then, whether or not the transfer by the element pattern E is over is judged (step P214). When it is judged that the transfer is not, a point Pj for performing the transfer processing is caltulated (step P217). This step is a portion, which decides the order of the transfer processing to be performed. There is a system of performing a scanning operation for each of the lines from the left, upper corner of the picture face. After the scanning point Pj has been given, the step returns to the step P213 to perform the transfer processing. As described before, the setting of the element pattern and the decision of a location where the transfer processing by the step P213 and the step P217 is performed given big influences to the image quality. In other words, considerably variable image-quality conversion may be performed through selection of these.

By the use of an image quality changing device, of the present invention, under such construction as described hereinabove, the image quality conversion of the images inputted from a television camera, a video camera or the like can be performed. By the changes in density, order of the shape of the element pattern which is the unit of the transfer and of the points for performing the transfer processing, the various image qualities may be selected in characteristics. Also, even those who does not have an art of drawing pictures may compose the images like the oil painting.

As the images can be putted in a moment by the use of the A/D conversion from a television camera or the like, time required for image composition is extremely short as compared with the conventional hand-writing inputs. Also, as an extremely simple processing operation of obtaining the color information from the image memory A and writing the color information by the region of the element pattern on the image memory B is used to vary the images, the images may be varied in a sufficient speed even by a 8-bits microprocessor such as Z80. Accordingly, the images may be varied in a short time.

Also, as the color information is converted into numeral value data, color-shade change, image expansion and contraction or the like may be performed in particular by the processing of the microprocessor.

The present invention enables an electronic picture image composing art method to be used, which is completely different from a method of drawing pictures on the canvas with the use of the conventional brush.

(Fourth Embodiment)

A fourth embodiment of the present invention is shown in FIG. 23 through FIG. 27.

FIG. 23 is a construction view of an apparatus of the present invention which has a coordinates inputting means 9, a controlling device 16 and two units of displays 10A, 10B. FIG. 24 is a block diagram showing an electric circuit example.

Referring to FIG. 24, 1 is a microprocessor for controlling use. 2 is a ROM for storing controlling programs, 3 is a RAM for storing the variables to be used in the controlling use. 6A, 6B are a first memory, a second memory of the image information memories including the color shade, and are adapted to normally display their contents on the displays 10A, 10B respectively through interface circuits 11A, 11B. 8 is an external storing device for storing the image data such as cassette tape, floppy disk, hard disk. 7 is its interface circuit. 4 is a keyboard for inputting the instructions.

To correct, edit the images, coordinates are required to be inputted without fail in the image processing device. For example, when the lines are added, they are the coordinates of the lines, when the images are cut down, they are coordinate of the lines to be cut down. At this time, the important thing is the positional relation between the inputted coordinates and images. To clarify this relationship, conventionally a system of displaying the cursor on the input coordinates points on the images was adopted.

Even in the present invention, this system is applied, the cursor display is simultaneously respectively on the input coordinates points of two units of display 10A, 10B with respect to one input coordinate point as shown in FIG. 23. Here the respective cursor displays 17A, 17B are different in shape, which will be described fully later. As the cursors are displayed on the same coordinate points of each picture face corresponding to each of the first memory 6A, the second memory 6B (see FIG. 24) like this, it is extremely easy to understood the corresponding relation between points when the image information of the same coordinates are transferred from a first memory 6A to a second memory 6B or from a second memory 6B to a first memory 6A.

FIG. 25 is a basic subroutine of the transfer. FIG. 26 is a flow chart showing the subroutine example of image processing.

In the basic subroutine, a coordinate value P is given as an input. First, an address on the first memory 6A (or the second memory 6B) corresponding to the coordinate value P is calculated to obtain (step P301) the information $C_p$ at the point. Then, an address on the other second memory 6B (or the first memory 6A) corresponding to the coordinate value P is calculated to write (step P302) the information $C_p$, which has been obtained at the step $n_1$, in this memory. And the step returns to the main routine (step P303).

In the image processing routine, cursors 17A, 17B are displayed (step P311) on both picture faces by the input of the coordinate value P and the above-described basic subroutine (step P312) is carried on to transfer the information of the coordinate value P. Then, whether or not the image processing finishes is judged (step P313), when the image processing has not been finished, the step returns to the sept P311 to continuously perform the processing cooresponding to the next coordinate value.

FIG. 27 are views for illustrating the composition of two picture faces to be performed by the above described processing. FIG. 27(a) shows original images stored in the first memory 6A, in which the branches and leaves of the narrow trees which have been difficult to be composed in the conventional system are drawn. When the trees are cut down to compose such background images as FIG. 27(b) stored in the other second memory 6B, certain coordinates of the trees are inputted by the use of the coordinate inputting device 1. And the color information or the like of the memory corresponding to the coordinate values P of the first memory 6A is read out by the processing of the controlling microprocessor 1, and is written in the second memory 6B. If the coordinate values are inputted through the tracing operation of the trees by the use of the coordinate input means 9, repeating this operation, it is possible to obtain such composed picture face as shown in FIG. 27(d) through the cutting operation of such picture face as in FIG. 27(c).

According to the present invention, the cursors 17A, 17B are displayed with the same coordinate points simultaneously on both the original images and the background images in such image composition, so that the corresponding relation among the points may be extremely understood, thus resulting in considerably improved operationality.

Also, which image is watched will be clarified when the shapes of the cursors 17A, 17B are changed on two units of displays 10A, 10B as described hereinabove. It is useful to show that the color information is obtained from which picture face when some processing operation is performed through the reading-out operation of the color information from certain points on the images. In the example illustrated in FIG. 23, suppose the cursor of "+" shape on the display 10A is an image to be watched, and the color information on the display 10A is read out, is transferred onto the display 10B if the color information of the input coordinate point is obtained in this condition. To exchange the images to be watched, the cursor of "+" and the cursor of "×" are required to be switched and displayed, respectively, on the display 10B and the display 10A by the instructions input from the keyboard 4 or the like. It is to be noted that the cursors may be distinguished by the difference among the other display embodiments such as color or flashing lighting, etc.

If the contents of the first, second memories of two picture-face portions are simultaneously displayed with two units of displays by the use of the image processing device of the present invention under such construction as described hereinabove, easier understanding is ensured during the composing operation of the images. In particular, effect is big in the processing where the transfer from one memory image to the other memory image is basic. Also, when a television for household use is used as a display, it does not matter so much to have two units of displays provided when they are used at home. The corresponding relation between the first memory and the second memory images may be easily understood by the simultaneous display of the cursors on two units of displays. Also, as which memory image is watched becomes clear by changes in cursor shape, it is effective in obtaining color information.

The operationality during the image processing operation may be considerably improved by the use of the device of the present invention.

(Fifth Embodiment)

A fifth embodiment of the present invention is shown in FIG. 28 through FIG. 32.

The image processing to be handled by an image processing apparatus in accordance with the present embodiment is that the processing operation with respect to one point is effected with respect to a plurality of points. The processing operations which can be performed by the use of this method are color shade changes, shading off, image quality change, whitening and blackening operations, etc. Here points to be processed for illustration are referred to as "processing points".

The characteristics of the present embodiment are that the image processings are divided into four processes as described hereinabove by the use of the conception of the processing point so as to set parameters individually. The four parameters are as follows.

(1) Scanning method of scanning points.
(2) Decision as to whether or not the processing is performed on the scanning points.
(3) Decision of the processing points around the scanning point which is to be performed.
(4) Processing contents of the processing points.

FIG. 28 is a block diagram showing the construction example of the device of the present invention.

A controlling microprocessor 1 is connected with a ROM 2 accommodating a control program therein through a bus, a RAM 3 for storing controlling variables, an instructions inputting device 4 such as key board or the like for inputting the controlling instructions. Furthermore, two image memories (A) 12, (B) 6 are connected with and the external storing device 8 such as floppy desk, hard desk or the like is connected through the interface 7 with this bus. To input the instructions, a method may be adopted of operating the cursor and selecting the instructions from the displayer menu by the use of a coordinate input device 9 such as digitizer, tablet or the like, instead of the key board or the like.

An image inputting device 13 for inputting the original images of the television camera, video tape recorder, television tuner, video disk player or the like inputs the original images to the image memory (A) 12 through an A/D converter 14, which converts the analog signals into digital signals. Also, the display 10 displays the contents of the image memory (B) 6 through a D/A converter 11 which converts the digital signals to the analog signals. Also, 18 is an area indication memory (C) of one picture-face portion to designate the area.

FIG. 29 is a flow chart for describing the operation of the image processing processes.

Here the scanning point is assumed to be P, the scanning point for performing the processing is assumed to be P', the processing point is assumed to be Qi.

At a step P401, the initial value of the scanning point P is set. The initial value varies by a method of scanning the images of the point P. At a step P402, it is decided whether or not the processing is performed at the scanning point P. The conditions of this decision are set as parameter in advance. Here when it is decided that the processing is not performed at the scanning point P, the processing flies to a step P405. A step P403 is a portion where the processing point Qi is determined on the basis of the scanning point P' which is to be processed. To determine the processing point Qi, there is a method of using a small pattern called element pattern.

This will be described by the use of FIGS. 30 (a), (b). FIG. 30 (a) is one example of the element pattern. In this case, a reference point is H, the element pattern is composed of four points $J_1$ through $J_4$ around the reference point H. The processing point $Q_1$ is assumed to be a point to be included in the element pattern when the element pattern has been drawn on the basis of the scanning point P'. This condition is shown in FIG. 30 (b). The $Q_1$ through $Q_4$ are processing points (dots).

Again, returning to FIG. 29, a step P404 is a portion where a predetermined processing is performed with respect to the processing points $Q_1$ through $Q_N$ (N is the number of the construction points of the element pattern) determined at the step P403. A step P405 is a portion for calculating the following scanning point P in accordance with a predetermined method. At a step P406, it is decided whether or not the processing is over, and when the processing operation continues, the processing is moved to the step P402.

As apparent from the above description, the processing process of the present invention has four types of parameters of (1) scanning method on the images, (2) decision reference as to whether or not the processing is performed at the scanning point, (3) determination of the processing points (element pattern), (4) processing contents, so that they may be set independently. As a result, such a compound image processing as to shade off only the edge region of the image may be easily performed.

The scanning methods of the scanning points are as follows.

(1) Hand-writing scanning. This is a method by which an operator directly inputs the scanning point P with the use of a coordinate inputting device 9 such as degitizer, tablet or the like. This method is used when the operator directly specifies a location to write handwritten letters or the processing the change in the color shade, the shading off or the like.

(2) Calculation scanning. This is a method by which a microprocessor 1 calculates the coordinates of the scanning points in accordance with the coordinates inputted by the use of a digitizer or the like. For example, this is a method of calculating a scanning point P so that points an operator has inputted may be connected with straight lines, of calculating a scanning point P so that the points may be connected with smooth curves or of inputting the center and the radius to calculate the scanning point P so that circular arcs may be described.

(3) Full face scanning. This is a method of automatically scanning the entire picture face. In this case, the ways are considered depending upon the scanning sequence. For example, there is a raster scanning method of sequentially scanning the rows one by one from the left, upper portion of the picture face or a method of performing the scanning operation in spiral condition externally from the center.

The decision reference is as follows.

(1) Processing area conditions. The conditions are used when the processing operation is performed only on a certain area on the picture face. There is a method of keeping written a location where the processing may be performed, and a location where the processing is not performed, on the memory (C) 18 for specifying the area corresponding to the picture face as the concrete method. And to decide whether or not the processing is performed on a certain scanning point P, it is decided whether or not the processing is performed from the data corresponding to the scanning point P on the memory (C) 18.

(2) Density conditions. The conditions determine the density (thinning out or the like) of the scanning point P in the picture face. Concretely the scanning operation is adapted not to be performed unconditionally in the scanning point of an odd number coodinate when the density of the scanning point is made one half under the conditions with respect to the coordinate of the scanning point P.

(3) Data conditions. It is decided whether or not the processing is performed from the scanning point P and the contents of the color information around it. It is used when the processing operation is performed only on a point of the color shade predetermined in advance, only on the edge portion of the image.

Determination (element pattern) of the processing point Qi is as follows.

(1) Dot. A processing point Qi is made only a central point (=a scanning point P' which is adapted to be processed) in an element pattern composed of a central point, one point only. Namely, the same processing as a case where the element pattern is not used is adapted to be performed.

(2) Normal. This is an element pattern comparatively concentrated on the central point and its vicinity. The image quality can be converted by the use of such patterns.

(3) Multi. This is an element pattern composed of points comparatively dispersed from the central point. As the processing point Qi is scatteringly dispersed by the use of this pattern, the repeating patterns can be produced.

FIG. 31 (a), FIG. 31 (b), FIG. 31 (c) are the examples of the element patterns of the dot, the normal, the multi.

Finally the processing contents will be described.

(1) Drawing processing. This is a processing by which the color information of the memory (B) 6 is replaced by the memory (A) 12 on the processing point $Q_1$. It is used when the images on the memory (A) 12 are imposed in the images of the memory (B) 12, lines are drawn on the memory (B) 12 in a color determined by the memory (A) 12.

(2) Shading off processing. This is a processing by which the color information in a certain range on the memory (A) 12 is averaged around the processing point Qi so that the color information of the processing point Qi on the memory (B) 6 is replaced by the average color information provided. This has an effect of shading off the images.

(3) Color average processing. This is a processing by which the color information of the memory (A) 12 and the color information of the memory (B) 6 are averaged on the processing point Qi so that the color information of the processing point Qi on the memory (B) 6 is replaced by the color information obtained. Two images are averaged so that images which seem to have been superposed are provided.

(4) Color shade change processing. This is a processing by which the color shade is changed, through a certain operation, in the color information of the processing Qi on the memory (B) 6 so that the color information of the processing point Qi on the memory (B) 6 is replaced by the color information obtained. It is used when the color shade of the images is changed.

(5) Whitening, blackening processing. This is a processing by which the brightness is calculated from the color information of the processing point Qi on the memory (B) 6 so that the color information of the processing point Qi on the memory (B) 6 is replaced by the color information of the non-color having the brightness. The processing is performed to provide the white, black images.

The concrete examples in a case where the images are partially changed in color, and in a case where the edges are processed, after the image composition, to render the green portion quiet in color will be described hereinafter.

First, an example of a compound processing of changing the color after the designation of the area will be described. FIG. 32 (a) is an original picture. Here a case is shown where the color of a car is shown.

At first, information showing the portion of the car is written on the memory (C) 18 for area specification use. FIG. 32 (b) show the contents of the memory (c) 18, the black portion being the area of the car. A method of, for example, moving the cursor on the original images to surround the portion of the car with a closed curve is considered as a method of inputting this area.

Then, in the parameter setting of the processing, the scanning method is assumed to be an entire face scanning (raster scanning system). As the processing conditions, only the area conditions are set, but density conditions, data conditions are not set. The element pattern uses the dots. The processing contents are assumed to be the color change.

When the above parameters are set to carry out the processing, the entire picture face is scanned by the raster scanning method so that the color changes in only the car area satisfying the area conditions. FIG. 32 (C) show the processed results.

Then, an example of the compound processing of the edge processing (shading off on the drawn lines) will be described. When a certain portion is cut from one of two sheets of images and is composed in the other sheet of images, the portion of the green is sharply cut enough to cause an obstruction of the eye. In this case, the edge portion is shaded off to render the images natural. In this case, the shaking-off processing is required to be performed only on the green portion.

Accordingly, the parameters are required to be set as follows to perform the image processing. First, the scanning method is a hand-writing method. The processing conditions are not set in particular. The normal pattern (FIG. 31 (b)) is set in the element pattern. Here if a large element pattern is set, the shading-off operation is performed in a wide range, of a small element pattern is set, the shading-off operation is performed in a small range. Assume the processing contents are the shake off.

Set the above parameters to carry out the processing, and the area to be shaked off comes to be able to be inputted hand-written. Thus, shade off the obstruction portions of the edges, watching the picture face.

The image processing device, of the present invention, composed of such construction as described hereinabove carries the image processing, independently setting four parameters of (1) scanning method of the scanning points, (2) deciding standard, (3) processing points (element pattern), (4) processing contents, with the result that the various composite image processing which has been impossible to perform may be performed so that pictures rich in varied expressions may be produced.

FIG. 33 is a block diagram showing the construction example of the apparatus of the present invention.

A microprocessor 1 for control use is connected through a bus with a ROM 2 with controlling programs accommodated therein, a RAM 3 for storing the controlling variables, an instruction inputting device 4 such as key board or the like for inputting the controlling instructions. Furthermore, this bus has two image memories (A) 12, (B) 6 connected therewith, an external storing device 8 such as floppy disk, hard disk or the like connected therewith through an interface 7. To input the instructions, a method may be used of operating the cursor and selecting instructions from the displayed menu with the use of an coordinate inputting device 9 such as digitizer, tablet or the like, instead of the key board or the like.

An image inputting device 13 for inputting the original images of television camera, video tape recorder, television tuner, video disk player or the like is adapted to input the original images into the image memory (A) 12 through an A/D converter 6 which converts the analog signals into the digital signals. Also, the displays 10A, 10B display the contents of the image memories (A) 12, (B) 6 respectively through the D/A converters 11A, 11B which convert the digital signals into analog signals. A memory (C) 18 for specifying one pictureface portion of area is used to specify the area or the like to be processed in the image processing.

FIG. 34 is a flow chart for illustrating the operation of the image processing process.

Here, the scanning point is assumed to be P, the scanning point for performing the processing point is assumed to be P', the processing point is assumed to be Qi.

At a step P501, an initial value of the scanning point P is set. This initial value changes by a method of scanning the picture face of the point P. At a step P502, it is decided whether or not the processing is performed at the scanning point P. The conditions of the decision are set in advance as parameters. Here it is decided that the processing is not performed at the scanning point P, the processing flies to a step P505. A step P503 is a portion where the processing point Qi is determined on the basis of the scanning point P' which is to be processed. To determine the processing point Qi, there is a method of using a small pattern called element pattern.

This will be described by the use of FIGS. 35 (a), (b). FIG. 35 (a) is one example of the element pattern. In this case, a reference point is H, the element pattern is composed of four points $J_1$ through $J_4$ around the reference point H. The processing point Qi is assumed to be a point to be included in the element pattern when the element pattern has been drawn on the basis of the scanning point P'. This condition is shown in FIG. 35 (b). The $Q_1$ through $Q_4$ are processing points (dots).

Again, returning to FIG. 34, a step P504 is a portion where a predetermined processing is performed with respect to the processing points $Q_1$ through $Q_n$ (N is the number of the construction points of the element pattern) determined at the step P503. A step P505 is a portion for calculating the following scanning point P in accordance with a predetermined method. At a step P506, it is decided whether or not the processing is over, and when the processing operation continues, the processing is moved to the step P502.

As apparent from the above description, the processing process of the present invention have four types of parameters of (1) scanning method on the images, (2) decision reference as to whether or not the processing is performed at the scanning point, (3) determination of the processing points (element pattern), (4) processing contents, so that they may be set independently.

In the concrete example of each parameter, for example, (1) The scanning methods of the scanning points are as follows.

(a) Hand-writing scanning. This is a method by which an operator directly inputs the scanning point P with the use of a coordinate inputting device 9 such as degitizer, tablet or the like. This method is used when the operator directly specifies a location to write hand-written letters or the processing the change in the color shade, the shading off or the like.

(b) Calculation scanning. This is a method by which a micro-processor 1 calculates the coordinates of the scanning points in accordance with the coordinates inputted by the use of a digitizer or the like. For example, this is a method of calculating a scanning point P so that points an operator has inputted may be connected with straight lines, of calculating a scanning point P so that the points may be connected with smooth curves or of inputting the center and the radius to calculate the scanning point P so that circular arcs may be desired.

(c) Full face scanning. This a method of automatically scanning the entire picture face. In this case, the ways are considered depending upon the scanning sequence.

(2) The decision reference is as follows.

(a) Processing area conditions. The conditions are used when the processing operation is performed only on a certain area on the picture face. There is a method of keeping written a location where the processing may be performed, and a location where the processing is not performed, on the memory (C) 18 for specifying the area corresponding to the picture face. And to decide whether or not the processing is performed on a certain scanning point P, it is decided whether or not the processing is performed from the data corresponding to the scanning point P on the memory (C) 18.

(b) Density conditions. The conditions determine the density (thinning out or the like) of the scanning point P on the picture face. It is decided whether or not the processing operation is performed on the scanning point P by, for example, the coordinates of odd numbers and even numbers.

(c) Data conditions. It is decided whether or not the processing is performed from the scanning point P and the contents of the color information around it. It is used when the processing operation is performed only on a point of a color shade predetermined in advance, only on the edge portion of the image.

(3) Determination (element pattern) of the processing point Qi is as follows.

(a) Dot. A processing point Qi is made only a central point (=a scanning point P' which is adapted to be processed) in an element pattern composed of a central point, one point only. Namely, the same processing as a case where the element pattern is not used is adapted to be performed.

(b) Normal. This is an element pattern comparatively concentrated on the central point and its vicinity. The image quality can be converted by the use of such patterns.

(c) Multi. This is an element pattern composed of points comparatively dispersed from the central point. As the processing point Qi is scatteringly disposed by the use of this pattern, the repeating patterns can be produced.

Finally (4) processing contents will be described.

(a) Drawing processing. This is a processing by which the color information of the memory (B) 6 is replaced by the memory (A) 12 on the processing point Qi. It is used when the images on the memory (A) 12 are imposed in the images of the memory (B) 12, lines are drawn on the memory (B) 6 in a color determined by the memory (A) 12.

(b) Shading off processing. This is a processing by which the color information in a certain range on the memory (A) 12 is averaged around the processing point Qi so that the color information of the processing point Qi on the memory (B) 6 is replaced by the average color information provided. This has an effect of shading off the images.

(c) Color average processing. This is a processing by which the color information of the memory (A) 12 and the color information of the memory (B) 6 are averaged on the processing point Qi so that the color information of the processing point Qi on the memory (B) 6 is replaced by the color information obtained. Two images are averaged so that images which seem to have been superposed are provided.

(d) Color shade change processing. This is a processing by which the color shade is changed, through a certain operation, in the color information of the processing Qi on the memory (B) 6 so that the color information of the processing point Qi on the memory (B) 6 is replaced by the color information obtained. It is used when the color shade of the images is changed.

(e) Whitening, blackening processing. This is a processing by which the brightness is calculated from the color information of the processing point Qi on the memory (B) 6 so that the color information of the processing point Qi on the memory (B) 6 is replaced by the color information of the non-color having the brightness. The processing is performed to provide the white, black images.

By the optional setting of parameters as described hereinabove, the various composite image processings of shading off only the edge regions of the images, or partially changing the color of the images may be easily performed.

When such artistic images as oil paintings are produced, the following two methods are considered.

(i) Original pictures like photograph are inputted into the image memory (A) 12 through an image inputting device 11 to automatically change the original pictures into oil-painting way. Furthermore, if necessary, the images obtained are finely corrected by the hand-writing.

(ii) Original pictures like photograph are inputted through an image inputting device 11 into the image memory (A) 12 to produce images looking like oil painting in dialogue in accordance with the original pictures.

The device of the present invention may produce the images even in any method. To produce the artistic images, particularly the following parameter setting means is provided.

(1) Scanning method—entire picture face scanning. The entire picture face is automatically scanned.

Some methods may be selected by the order scanning in this. There are a raster scanning method of sequentially scanning the lateral rows one by one from the left above the picture face, a method of scanning spirally towards the outside from the center, a method of scanning the entire picture face in random numbers, a method of performing an oblique scanning operation. The differences among these scanning method will be described later.

(2) Decision references wherein points to be processed (scanning point P') are properly scattered on the entire picture face by the results of the decision reference-decision, the representative one is that the change ratio of the color data near the scanning point P is lower than a certain value. In this case, lateral change ratio, longitudinal change ratio, the average therebetween, green-color data change ratio, red-color data change ratio, brilliance change ratio, color degree change ratio or the like (data conditions) are provided as change ratio.

Also, there are methods of selecting the scanning point P' in random numbers or of performing an operation located at the coordinates of the scanning point P to select the scanning point from the result, as the other reference. There is a method, as a concrete example of the method of the latter, of considering whether or not the following equation is satisfied as a reference.

$$(P_X \wedge x) \vee (P_Y \wedge y) = \phi$$

$\wedge$ is AND, $\vee$ is OR where in the coordinate of the scanning point P is (X, Y) and the parameter is ($P_X$, $P_Y$).

Suppose $P_X = P_Y = 1$, and the scanning point P' is adapted (density conditions) every other points both the longitudinal direction and the lateral direction in this method.

These methods in the decision reference may be used not only singly, but also jointly.

As described hereinabove, a decision reference may be any decision reference if only it is such a reference as a reference point P' to be selected by it may be properly dispersed on the entire picture face. However, to obtain the steady image quality, it is proper to use a reference in which the change ratio of the color data in the scanning point P is smaller than a certain value. The effect will be described later.

(3) Determination (element pattern) of a processing point-various element patterns are considered. The effect of the element pattern will be described later.

(4) Processing contents-processing of writing the color data of the scanning point P' located on the image memory (A) 12 stored in the original picture in the processing point Qi of the image memory (B) 6 storing the processed result. The equation, if represented, is as follows.

$$B(Qi) := A(P')$$

wherein P' is a scanning point which has satisfied the decision reference, Qi is a processing point produced with the P' as a reference, A(P') is the color data of the P' on the image memory (A) 12, B(Qi) is the color data of the Qi on the image memory (B) 6. := remains substitution. A principle of producing image like oil paintings will be described as follows.

The K of FIG. 36 is a picture face of the image memory (A) 12, the E is an element pattern selected. Of a processing is carried out with respect to a certain scanning point P', an element pattern having the color of the P' point of the image memory (A) 12 is drawn on the picture face L of the image memory (B) 6. The results obtained from seven point of scanning points $P'_1$ through $P'_7$ are FIG. 37 (a), (b). In this case, as the scanning operation is performed in the order of 1 through 7, the element pattern initially drawn on the L picture face is partially changed in paint into an element pattern later surrounded, thus resulting in complicated shape as shown in FIG. 37 (b). This becomes equivalent to an oil painting work, thus producing oil-painting-like images.

Now set the color data of the scanning point P' of the image memory (A) 12 as the processing contents of (iv) in the processing of moving the color data into the processing point Qi of the image memory (B) 6, the full picture face scanning as the scanning method of the (i), the color change ratio of the scanning point P as the decision reference of the (ii) is smaller than a certain value, an element pattern like the E of FIG. 36 as the determination of the processing point of the (iii), and artistic images like oil painting may be automatically produced from the photograph-like images.

That the touches are changed by the element patterns is apparent from the above-described principle. In the decision reference, FIG. 38 has the scanning points P to be processed reduced in number as compared with FIG. 37. As apparent from FIG. 38 (b), rougher picture faces are provided than FIG. 37 in this case. Also, when the positions are different if the scanning points P' to be processed are the same in number, the touches become naturally different. In any cases, to produce the oil-painting-like images, the reference is required to be such an one as the scanning points P' to be processed may be properly dispersed on the entire picture face.

The choice of the scanning points, which are less in terms of change ratio of the color data, has an advantage in that the scanning points P' are properly scattered on the entire picture face along the original images, also the fine portions of the images are lost, so that large picture face which is suitable for oil painting is provided.

It is to be noted that the choice of the decision reference in, for example, the random numerals may produce the images of such touches as noises are left.

Although the scanning method is not specified here in particular, the touches may be variably changed even by this setting. In FIG. 39 (a), (b), the scanning order is provided from the right-hand side into the longitudinal direction. They become different in the color remaining shape from FIG. 37 (b) in a case where the scanning order is provided from the left-hand side into the lateral direction. In FIG. 37 (b), the left, upper portion of the element pattern (see the E of FIG. 36) remains, in FIG. 39 (b), the right, upper portion of the element pattern remains. These show one example, and become different depending upon the spiral, random-numeral scanning, the oblique scanning or the like. These may be properly determined in accordance with the original images, the images after composite processing.

A case where images like the oil painting are automatically produced is described hereinabove and a method of producing them in a dialogue way will be described hereinafter. In this case, the scanning method of the (i) is changed as follows.

(1) Scanning method-hand writing scanning or calculation scanning. The hand writing scanning is a method for an operator performs a direct inputting operation of the scanning points by the use of the coordinate inputting device 9. The calculation scanning is a method by which the processing device moves the scanning points in accordance with the coordinates inputted by the operator in the same method.

In the calculation scanning, a method of performing a scanning operation as the inputted coordinate points are connected with straight lines, a method of performing a scanning operation as they are connected with smooth curves, a method of performing a scanning operation as circular arcs may be described around the inputted coordinate points or the like method is selectable.

If the entire picture face is scanned by such a hand writing scanning operation, the original images may be changed like an oil painting in an optional scanning order though they are rougher than in the automatic scanning. Also, the image quality may be changed while the results are being confirmed by a display 10 B, which displays the contents of the image memory (B) 6, if a dialogue-like image composing method is used. As the portion to be processed in particular may be specified in a dialogue way, only one portion of the original picture may be made into the oil painting touch. Needless to say, in these cases, the other parameters may be set into the others on occasion.

It is to be noted that this is applicable even when the images obtained by an automatic scanning are required to be finely corrected. For example, the partial repainting operation may be changed by the different scanning order of the hand writing, also the hand writing may be scanned by the partial change in the element pattern when necessary.

According to the image processing device of the present invention, as described hereinabove, a device may be provided, which may systematically combine various image processings that independently existed as a single function to perform flexible composite processings, and may produce artistic images like oil paintings from the actual images like photograph by a simple operation.

Namely, the image processing device of the present invention has functions of applying image processings upon the images inputted from the general picture appliances such as television, photograph, VTR, etc. to automatically composite artistic images such as oil painting, of finely correcting the images obtained in a manner as described hereinabove, also of changing parameters to composite the various oil-painting touch of images in the dialogue way.

By the use of this device, even persons who has no skill of drawing pictures may easily draw artistic images like the oil painting without staining the hands and using instruments such as brush, colors, etc.

(Seventh Example)

A seventh example of the present invention is shown in FIG. 40 through FIG. 48.

FIG. 40 is a block diagram showing the construction example of the apparatus of the present invention.

A microprocessor 1 for control use is connected through a bus with a ROM 2 with controlling programs accommodated therein, a RAM 3 for storing the controlling variables, an instruction inputting device 4 such as key board or the like for inputting the controlling instructions. Furthermore, this bus has two image memories (A) 12, (B) 6 connected therewith, an external storing device 8 such as floppy disk, hard disk or the like connected therewith through an interface 7. To input the instructions, a method may be used of operating the cursor and selecting instructions from the displayed menu with the use of an coordinate inputting device 9 such as digitizer, tablet or the like, instead of the key board or the like.

An image inputting device 13 for inputting the original images of television camera, video tape recorder, television tuner, video disk player or the like is adapted to input the original images into the image memory (A) 12 through an A/D converter 14 which converts the analog signals into the digital signals. Also, the displays 10 A, 10 B display the contents of the image memories (A) 12, (B) 6 respectively through the D/A converts 11 A, 11 B which convert the digital signals into analog signals. A memory (C) 18 for specifying one picture-face portion of area is used to specify the area or the like to be processed in the image processing.

FIG. 34 is a flow chart for illustrating the operation of the image processing process.

Here, the scanning point is assumed to be P, the scanning point for performing the processing point is assumed to be P', the processing point is assumed to be Qi.

At a step P601, an initial value of the scanning point P is set. This initial value changes by a method of scanning the picture face of the point P. At a step P602, it is decided whether or not the processing is performed at the scanning point P. The conditions of the decision are set in advance as parameters. Here when it is decided that the processing is not performed at the scanning point P, the processing flies to a step P605. A step P603 is a portion where the processing point Qi is determined on the basis of the scanning point P' which is to be processed. To determine the processing point Qi, there is a method of using a small pattern called element pattern.

This will be described by the use of FIG. 42 (a), (b). FIG. 42 (a) is one example of the element pattern. In this case, a reference point H, the element pattern is composed of four points $J_1$ through $J_4$ around the reference point H. The processing point Qi is assumed to be a point to be included in the element pattern when the element pattern has been drawn on the basis of the scanning point P'. This condition is shown in FIG. 42 (b). The $Q_i$ through $Q_4$ are processing points (dots).

Again, returning to FIG. 41, a step P604 is a portion where a predetermined processing is performed with respect to the processing points $Q_1$ through $Q_n$ (N is the number of the construction points of the element pattern) determined at the step P603. A step P605 is a portion for calculating the following scanning point P in accordance with a predetermined method. At a step P606, it is decided whether or not the processing is over, and when the processing operation continues, the processing is moved to the step P602.

As apparent from the above description, the basic image processing processes of the present invention have four types of parameters of (1) scanning method on the images, (2) decision reference as to whether or not the processing is performed at the scanning point, (3) determination of the processing points (element pattern), (4) processing contents, so that they may be set independently.

A method newly devised to realize the shading-off processing of directional property has the following two points.

(1) The scanning direction of the scanning points, concretely the direction of the present scanning point viewed from a scanning point before this scanning point in the determining operation of the processing point by the use of the element pattern is taken into consideration.

(2) The processing contents also take into consideration the scanning direction as in the (1).

A concrete example will be described hereinafter. First the scanning direction is divided into four directions I through IV as shown in FIG. 43 (a). In a method of determining a processing point Qi from the construction points of the element pattern, a construction point at the left end of the lowermost row is assumed to be $Q_1$ in the case of I, a processing point Qi (i=1 through N) is determined so that the scanning operation may be performed in order from the bottom to the top. In the case of the II through IV, the order from $Q_1$ to $Q_N$ changes in accordance with the scanning direction of the scanning point respectively as shown in FIG. 43 (b).

Then, in the processing contents, as vectors showing directions, (dx, dy), as shown in FIG. 43 (c), (1, −1), (−1, 1), (−1, −1), (1, −1) are corresponded to I through IV. And the processing is performed as in the following equation. B (x, y) is the color information of the image memory B. (x, y) is the coordinate of the processing point Qi.

$$B(x, y) = \tfrac{1}{4}[2 \times B(x, y) + B(x-dx, y) + B(x, y-dy)]$$

The processing will be described by the use of FIG. 44, FIG. 45, FIG. 46. FIG. 44 (a) is the image information before the processing operation. For illustration, data of 128 is contained only in one point X and the other data are 0. The element pattern to be used in obtaining the processing point is a square of 5×5 with a center as a scanning point shown in FIG. 44 (b). First, FIG. 45 (a), (b) shows a case where the scanning P is on a point X, the scanning direction is right up. FIG. 45 (a) shows the order of the processing points Qi through $Q_9$. FIG. 45 (b) show the processed results. In this case, (dx, dy)=(1, 1).

Then, a case where the scanning point P is also on a point X, the scanning direction is right, below (equivalent to IV) is shown in FIG. 46 (a), (b). FIG. 46 (a) shows the order of the processing points $Q_1$ through $Q_9$. FIG. 46 (b) show processed results. As apparent from FIG. 45 (b), FIG. 46 (b), the shading-off direction of the present invention is different in a shading-off direction, depending upon the scanning direction. In the scanning method, three such as handwriting scanning, calculation scanning, full face scanning may be selected by selection of the scanning method of FIG. 41 flow chart step P605. As the scanning may be specified in dialogue way particularly in writing scanning, calculation writing, the scanning direction may be freely changed. If the scanning point is scanned from left to right as shown in FIG. 47 (b) with respect to such original picture as painted in two colors of black, white as in, for example, FIG. 47 (a), such an effect as the black area may be stained into the white area can be provided as in FIG. 47 (c). If the method of the present invention is used like this, the shading-off processing of directional property may be performed.

Then, the extent of the shading off operation may be coped with by changes in the size of the element pattern. For example, if the element is reduced into 3×3 under the same conditions as those of FIG. 44, FIG. 45, the results as in FIG. 48 (a), (b) are provided so that the range to be shaded off at one time becomes smaller.

If an image processing device, of the present invention, of such construction as described hereinabove, the shading off operation of changed directional property may be performed by changes in the scanning direction of the scanning point. Also, by changes in the size of the element pattern, the extent of the shading off may be selected. If the scanning method is of a hand-writing scanning or a calculating scanning by the use of these functions, the portion to be shaded off may be specified in the dialogue way so that the original picture may be converted into artistic images like painting in India ink. According to the present apparatus, various image processings which existed independently as single function respectively may be systematically combined, thus allowing flexible composite processings to be performed.

The device of the present invention is effective as a new picture composing means, which is adapted to input original pictures like photograph from video signals, apply the various processings upon them to convert them into artistic images.

What is claimed is:

1. An image processing device, comprising a first memory means and a second memory means for storing the color light and shade information of at least two picture-face portions, a coordinate inputting means, a means for transferring and processing between said first and second memory means the image information of points specified by said coordinate inputting means, at least two units of display means for displaying the contents of said first memory means and said second memory means respectively, a plurality of means for performing cursor-displays in the different picture-image portions simultaneously on said units of display means corresponding to the coordinate points inputted by said coordinate inputting means, each of said plurality of means for performing cursor-displays being adapted for providing images different in shape from each other.

* * * * *